(12) United States Patent
Powell

(10) Patent No.: US 10,359,640 B2
(45) Date of Patent: Jul. 23, 2019

(54) FLOATING IMAGE DISPLAY

(71) Applicant: Microsoft Technology Licensing, LLC, Redmond, WA (US)

(72) Inventor: Karlton David Powell, Lake Stevens, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 99 days.

(21) Appl. No.: 15/429,001

(22) Filed: Feb. 9, 2017

(65) Prior Publication Data

US 2017/0261758 A1    Sep. 14, 2017

Related U.S. Application Data

(60) Provisional application No. 62/305,467, filed on Mar. 8, 2016.

(51) Int. Cl.
*H04N 13/00* (2018.01)
*G02B 27/22* (2018.01)
(Continued)

(52) U.S. Cl.
CPC ....... *G02B 27/2292* (2013.01); *G02B 3/0062* (2013.01); *G02B 5/32* (2013.01);
(Continued)

(58) Field of Classification Search
CPC ....... H04N 13/0022; H04N 2013/0081; G02B 27/2292; G02B 5/32; G02B 27/123; G02B 7/023
See application file for complete search history.

(56) References Cited

U.S. PATENT DOCUMENTS 8,299,980 B2* 10/2012 Takahashi .......... G02B 27/2292
345/4
2004/0021802 A1   2/2004 Yoshino et al.
(Continued)

FOREIGN PATENT DOCUMENTS

CN    104297932 A    1/2015
CN    104407441 A    3/2015

OTHER PUBLICATIONS

ISA European Patent Office, International Search Report and Written Opinion Issued in PCT Application No. PCT/US2017/020108, dated May 23, 2017, WIPO, 10 pages.
(Continued)

*Primary Examiner* — Tsion B Owens
(74) *Attorney, Agent, or Firm* — Alleman Hall Creasman & Tuttle LLP

(57) ABSTRACT

Examples are disclosed that relate to optical systems. One example provides a display device comprising an image source including a plurality of encoded regions from which encoded image light is output, and a Fourier transform array. The Fourier transform array may be positioned to receive the encoded image light and output decoded image light that forms a floating image viewable from a plurality of different vantage points, wherein from a first vantage point decoded image light forming a portion of the floating image originates from a first encoded region, and wherein from a second vantage point decoded image light forming the portion originates from a second encoded region, different than the first encoded region.

20 Claims, 16 Drawing Sheets

(51) Int. Cl.

| | |
|---|---|
| *H04N 13/128* | (2018.01) |
| *H04N 13/356* | (2018.01) |
| *H04N 13/161* | (2018.01) |
| *G02B 5/32* | (2006.01) |
| *G02B 7/02* | (2006.01) |
| *G02B 27/10* | (2006.01) |
| *G02B 27/12* | (2006.01) |
| *G02B 3/00* | (2006.01) |

(52) U.S. Cl.
CPC ......... *G02B 7/023* (2013.01); *G02B 27/1066* (2013.01); *G02B 27/123* (2013.01); *G02B 27/2214* (2013.01); *H04N 13/128* (2018.05); *H04N 13/161* (2018.05); *H04N 13/356* (2018.05); *H04N 2013/0081* (2013.01)

(56) References Cited

U.S. PATENT DOCUMENTS

| | | |
|---|---|---|
| 2004/0212550 A1 | 10/2004 | He |
| 2005/0122394 A1 | 6/2005 | Furugoori et al. |
| 2006/0120583 A1* | 6/2006 | Dewaele ............ G06T 3/0068 382/128 |
| 2008/0218853 A1 | 9/2008 | El-Ghoroury et al. |
| 2009/0060300 A1* | 3/2009 | Neemuchwala ....... A61B 6/463 382/128 |
| 2009/0273834 A1* | 11/2009 | Korenaga ............ G02B 5/1885 359/463 |
| 2010/0134410 A1 | 6/2010 | Tomisawa |
| 2010/0245345 A1* | 9/2010 | Tomisawa ............ G02B 3/0062 345/419 |
| 2010/0283838 A1 | 11/2010 | Tomisawa et al. |
| 2011/0175906 A1* | 7/2011 | Zheng ................. H04N 13/305 345/419 |
| 2011/0234770 A1 | 9/2011 | Zerrouk et al. |
| 2014/0192281 A1* | 7/2014 | Smithwick ........... G02F 1/1313 349/15 |
| 2014/0300869 A1 | 10/2014 | Hirsch et al. |
| 2014/0347361 A1 | 11/2014 | Alpaslan et al. |

OTHER PUBLICATIONS

Arai, et al., "Gradient-index lens-array method based on real-time integral photography for three-dimensional images", In Journal of Applied Optics vol. 37, Issue 11, Apr. 10, 1998, 3 pages.

Matusik, et al., "3D TV: A Scalable System for Real-Time Acquisition, Transmission, and Autostereoscopic Display of Dynamic Scenes", In Proceedings of the 31st International conference on computer graphics and interactive techniques, Aug. 8, 2004, 11 pages.

Pastoor, et al., "3D Displays: A review of current technologies", In Journal of Displays, vol. 17, Issue 2, Apr. 1, 1997, pp. 1-20.

Geng, Jason, "Three-dimensional display technologies", In Journal of Advances in Optics and Photonics, vol. 5, Issue 4, Dec. 31, 2013, pp. 1-123.

Okano, et al., "Three-dimensional video system based on integral photography", In Journal of Optical Engineering, vol. 38, Issue 6, Jun. 1, 1999, 2 pages.

\* cited by examiner

FLOATING IMAGE DISPLAY

CROSS REFERENCE TO RELATED APPLICATIONS

This application claims priority to U.S. Provisional Patent Application No. 62/305,467, filed Mar. 8, 2016, the entirety of which is hereby incorporated herein by reference.

BACKGROUND

Various optical systems have been developed to enable object imaging, display output, and/or other functions. An optical system may be configured for non-contact object imaging using a lens array, for example. As another example, a lens array may be provided with a display to enable the output of floating images.

SUMMARY

Examples are disclosed that relate to optical systems. One example provides a display device comprising an image source including a plurality of encoded regions from which encoded image light is output, and a Fourier transform array. The Fourier transform array may be positioned to receive the encoded image light and output decoded image light that forms a floating image viewable from a plurality of different vantage points, wherein from a first vantage point decoded image light forming a portion of the floating image originates from a first encoded region, and wherein from a second vantage point decoded image light forming the portion originates from a second encoded region, different than the first encoded region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
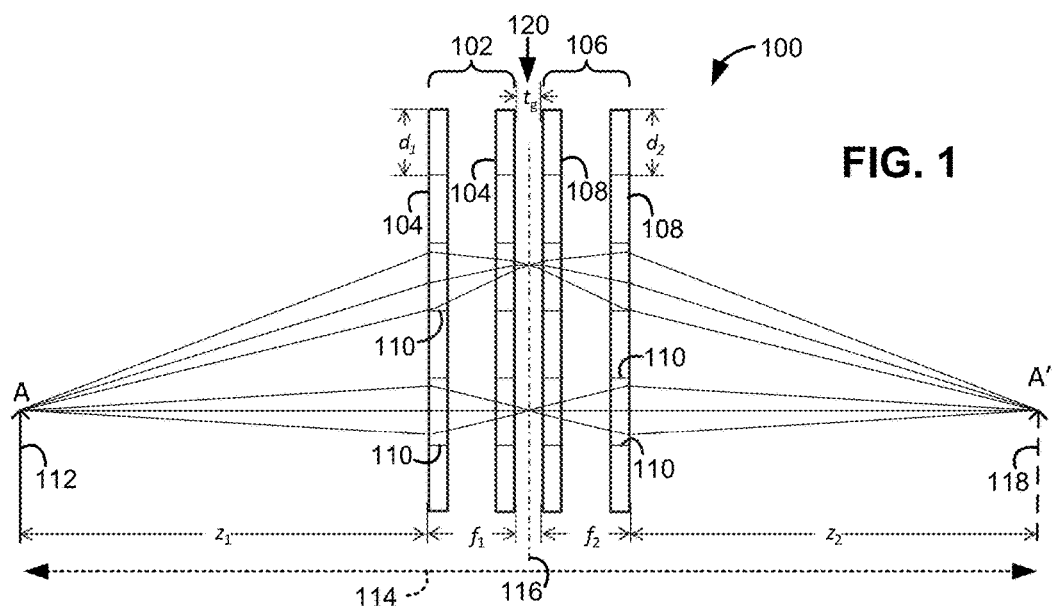
FIG. 1 is a schematic view of a lens system having two lens array assemblies with cells that exhibit Fourier transform lenses in accordance with one example.

Relayed imaging involves the transfer of light of an object such as a source, mask, or sample to a photodetector array, substrate, or other image sensor or light-sensitive medium. Optical relay systems, such as arrays of graded index (GRIN) rod lenses, have been used in printers and facsimile machines. The rods have a certain length to allow their parabolic refractive index profile to image a given conjugate distance. The resulting systems are accordingly often too bulky for many applications. For example, the total conjugate length (the total track length of object plane to image plane) is often in the range of 9 millimeters (mm) to 80 mm.

Lens systems provide relayed imaging via stacks or assemblies of lens arrays, such as microlens arrays (MLAs). The MLAs of the stacks are assembled such that conelets of light are stitched into a complete numerical aperture (NA) without gapping. Erect, high efficiency imaging is achieved. The lens system includes an imaging core of two lens array assemblies. In some cases, each assembly includes a pair of in-tandem MLAs. The MLAs of each pair are, in turn, separated by the focal length of the constituent lenslets (e.g., array elements) of the MLAs. The MLAs may thus be disposed in a compact stack configuration. For example, one imaging relay lens system has a total track length of 4.3 mm. The lens systems are accordingly capable of imaging large areas while avoiding the large volumes and bulky limitations of classical lens systems. The lens systems also provide the relayed imaging with fewer parts than other imaging relays.

The focal length separation of the two in-tandem pairs leads to high efficiency imaging. Each in-tandem pair implements a full, true Fourier transform between position space and angle space (or spatial frequency space). A transformation into angle space is provided by the first pair at an intermediate transform plane between the two pairs. The second pair then implements a second transformation from angle space back to position space to provide the erect image at an image distance determined as a function of (i) the focal lengths of the MLAs, (ii) the pitches of the MLAs, and (iii) the distance between the two pairs, for a given object distance. The function may thus be used to configure the lens system arrangement to form the image at a desired image distance. As described herein, formation of a real, non-inverted image is provided by satisfying the following two constraints: (1) providing consistent imaging conjugate distances within an array element, and (2) convergence of image content across multiple imaging elements within the array.

Implementing a full Fourier transform avoids losses and other distortions by addressing the diffraction arising in connection with each MLA. Without the second MLA for each cell, the transform appears to be a Fourier Transform (FT) in intensity, but not in phase, as a quadratic phase error remains Phase correction is provided by the second MLA of each pair, which effectively provides telecentric correction of the output. The inner array of each in-tandem FT MLA pair prevents loss and scatter of light having higher spatial frequency content, or light having higher angle of incidence, at the intermediate transform plane. Without phase correction at these inner arrays, a portion of light involved in fully resolving the object (within the diffraction limit defined by lenslet acceptance numerical aperture NA) would be lost. By making use of in-tandem FT MLA pairs, apodization is accordingly avoided, thereby reducing diffractive artifacts and minimizing loss of system resolve or loss of optical performance, such as Modulation Transfer Function (MTF). The fully formed diffraction output of the first in-tandem pair is then fully utilized by the second in-tandem pair to instead improve the efficiency of the lens system and, thus, image quality. Clipping and vignetting are also avoided via the phase correction. The MLA-based lens system is instead capable of stitching conelets of light into a complete numerical aperture (NA) without gaps.

Higher efficiencies may also be attainted due to a higher fill factor of the MLAs. Some microlens arrays are capable of being molded with 100% fill factor. For example, microlens arrays formed by replication using an etched master or diamond machining may achieve 100% fill factor, while microlens arrays formed by photoresist reflow will have flat gaps between lenslets, and microlens arrays formed by grey-scale lithography may exhibit rounded seams at the edges of each lenslet causing scatter. Other solutions, such as GRIN rod arrays, have a 10% loss in fill factor arising from hexagonal packing of round rods. Further, arrays of round lenses have similar gaps in fill factor. By making use of high fill factor types of MLAs or GRIN fiber faceplates from boules, or arrays of lenses each having a shape suitable for tiling, including hexagonal, rectangular, and square shapes, high efficiency may be maintained. MLAs may utilize aperture array masking at any plane within the stack to help reduce scatter of input light higher than the acceptance of each lenslet, while extra mural absorption (EMA) glass or fiber may be utilized periodically within a GRIN fiber array to reduce such scatter.

The arrangement of the MLA pairs provides output without a tiling effect, the so-called lensitization arising from lens system acceptance and pointing angle. The tiling effect is avoided without having to resort to extensive increases in overall system length. The lens systems may therefore be provided in a compact, or thin, form factor (e.g., a stack of sheets or thin films) appropriate for electronic devices, such as phones, tablets, laptops, and other devices having a thin profile for portability and/or other reasons.

The relay imaging of the lens system is capable of being achieved in a non-contact manner. For example, a lens or other optical element is not necessary at the image plane. Such non-contact imaging is useful when imaging through transparent media, e.g., transfers through windows, as in the case of, for instance, fingerprint readers. The lack of contact is also useful in connection with transfers to substrates, as in the case of, for instance, photolithography or transfers to an image sensor such as a microscope.

The lens systems are scalable without increases in system volume. The lens systems are capable of being scaled to handle larger lateral areas without any increase in track length. The thickness of the lens system thus does not increase. The lens systems may also be scaled to accommodate different object conjugate distances without significant increases in volume. Such scaling may also be useful in connection with imaging at short conjugate lengths. For instance, total conjugate lengths less than 9 mm are achievable.

The lens systems are telecentric in some cases. For example, the two in-tandem MLA pairs may be arranged to provide telecentric output for objects that are sufficiently far enough away from the lens system. Telecentric output is achieved without having to rely on a physical layer (e.g., a field lens) at the image plane. The lens systems accordingly avoid introducing mechanical interference issues in connection with, for instance, photolithography (e.g., avoiding contact with the wafer being exposed). In other cases, field correction may be used to achieve symmetric behavior. Input and output may be substantially telecentric. The ability to provide telecentric output avoids distortion and defocusing present in previous lens systems.

The two in-tandem MLA pairs of the lens systems may be arranged to provide unity or non-unity magnification. The respective focal lengths or respective pitches of the MLA pairs differ in non-unity magnification examples.

In some cases, the relay imaging of the lens systems is provided in connection with digital integral imaging.

Although described in connection with digital integral imaging in connection with portable electronic devices (e.g., tablets having touchscreens), the lens systems are well suited for a wide variety of digital integral imaging applications and usage scenarios.

The lens systems are not limited to particular types of MLA-based array assemblies. Other types of lensing structures and arrays may be used for each one of the lens array assemblies. For instance, each lens array assembly may include an array of GRIN microlensing structures. Each GRIN microlensing structure of the array then corresponds with a respective one of the cells of each lens array assembly. As used herein, the term "cell" is used to refer to a unit of each array assembly. Because, in some cases, an array assembly includes a pair of arrays, a cell may include an FT pair of array elements, one from each array. In other cases (e.g., GRIN cases), a cell corresponds with a single element of the array that provides the equivalent of an FT lensing pair.

FIG. 1 is a schematic view of a lens system 100 configured to operate as an imaging relay. The lens system 100 includes two lens array assemblies. In this example, one assembly of the lens array assemblies of the lens system 100 includes a first pair 102 of in-tandem microlens arrays 104. The other assembly of the lens array assemblies 100 includes a second pair 106 of in-tandem microlens arrays 108. Each lens array assembly has a plurality of cells. As described below, each cell is configured to exhibit a pair of Fourier transform lenses. In this example, each microlens array 104, 108 includes a respective set of constituent lenslets 110, respective pairs of which make up each cell of the lens array assemblies.

Light from an object 112 diffuses as it approaches the lens system 100. The object 112 is separated from the lens system 100 by an object distance $z_1$. A few example rays of light are shown in FIG. 1. The example rays propagate from a point A on the object 112 toward the first pair 102 of arrays 104. In many cases, light from the object 112 encounters each of the lenslets 110 to the extent permitted by the numerical aperture, or acceptance cone, of the microlens array 104.

The microlens arrays 104, 108 of the two array pairs 102, 106 are positioned to achieve relay imaging. Each array 104, 108 is generally disposed, or oriented, along a respective plane, as shown in FIG. 1. The respective planes and, thus, the arrays 104, 108, are separated from one another along an optical axis 114. The arrays 104 of the first pair 102 are spaced from one another by a distance $f_1$. The arrays 108 of the second pair 106 are spaced from one another by a distance $f_2$. The array pairs 102, 106 are spaced from one another by a distance $t_g$ (or D). Each distance is an effective optical distance determined in accordance with the refractive index of the medium through which light passes when transmitted over the particular distance. Each distance is selected in accordance with a function that establishes the image conjugate distance for the relay imaging of the lens system 100. The image conjugate distance is established by satisfying the constraints of (1) providing imaging conjugate distances within a lenslet as well as (2) convergence of image content across multiple imaging cells within the assembly, thereby enabling formation of a real, non-inverted image.

The distances $f_1$ and $f_2$ are set in accordance with the focal lengths for the cells, e.g., the lenslets 110 of the arrays 104, 108. The distance $f_1$ is the common focal length of the cells of the first lens array assembly, e.g., the lenslets 110 of the arrays 104. The distance $f_2$ is the common focal length of the cells of the second lens array assembly, e.g., the lenslets 110 of the arrays 108.

The focal length separation of each array 104 of the pair 102 establishes that the array pair 102 implements a Fourier transform of the light emanating from the object 112. For objects at an infinite distance from the first array pair 102, $t_g$ is zero and the Fourier transform is a phase-corrected Fourier transform from the angle space of the light emanating from the object 112 into position space (or spatial frequency space), as explained herein. The array pair 102 provides a representation of the phase-corrected Fourier transform along a plane 116 disposed between the array pairs 102, 106. The plane 116 is accordingly referenced as an intermediate transform plane. For closer object distances, the distance $t_g$ increases, such that the intermediate transform plane 116 exists at a finite distance from and between the arrays 104 and 108. As described below, for a given lenslet design, the distance or optical gap $t_g$ follows a mathematical relationship dependent on object distance along with other lenslet parameters. A stack having a fixed $t_g$ may function reasonably well over a limited range of object distances in proximity to the design object distance.

Use of two-lens in-tandem Fourier transform MLA pairs enables higher spatial frequency content (corresponding to higher angle light) to transmit into the intermediate transform plane without clipping. Such transmission, in turn, allows formation of a Sinc-like function that is more highly resolved, containing higher spatial frequency content, and limited primarily only by MLA acceptance numerical aperture (NA). This in turn allows the converging conelets out of each cell to be stitched forming a core NA without gaps within the solid angle of the NA. Impact on the Fourier transform due to lenslet sag profile may be reduced by using aspheric lenslet profiles, such as a conic constant in the range of −0.25 to −0.4, or other aspheric profiles.

The focal length separation of each array 108 of the pair 106 establishes that the array pair 106 implements a Fourier transform of the light associated with the representation at the intermediate transform plane 116. The Fourier transform is again a phase-corrected transform. The array pair 106 transforms the representation at the intermediate transform plane 116 from angle space back into position space.

The two array pairs 102, 106 are positioned relative to one another along the optical axis 114 to establish that the lens system 100 is an imaging system. That is, the distance D between the two array pairs 102, 106 establishes that the lens system 100 provides an erect image 118 of the object 112. The image 118 is provided at an image conjugate distance $z_2$ from the array pair 108.

The image conjugate distance $z_2$ is established via a function of the object conjugate distance $z_1$ for the object 112, the distance D between the array pairs 102, 106, a first pitch of the first array pair 102, a second pitch of the second array pair 106, and the common focal lengths $f_1$, $f_2$. The function establishes that the light emanating from the object 112 and passing through the constituent lenslets of the in-tandem microlens arrays of the array pairs 102, 106 converges at the image conjugate distance $z_2$. Further details regarding the function are provided hereinbelow in connection with parameters identified in FIG. 1.

For two lenses in tandem, $f_{1a}$ and $f_{1b}$, separated by distance D, the distance $s_i$ after the last lens at which an image of the input object 112, at distance $z_0$ before the first lens, occurs may be defined as $$s_i = \frac{f_{1b}(D(f_{1a} - z_o) + f_{1a}z_o)}{D(f_{1a} - z_o) + f_{1b}z_o + f_{1a}(z_o - f_{1b})}$$

However, when focal lengths $f_{1a}$ and $f_{1b}$ are configured as a Fourier Transform pair, such that $f_{1a}=f_{1b}=f_1$ and separation distance $D=f_{1a}=f_1$, then the image distance of input object A, occurs at distance $s_i$ after the last lens, which simplifies to $z_{g1}$:

$$z_{g1} = \frac{f_1(f_1(f_1 - z_o) + f_1 z_o)}{f_1(f_1 - z_o) + f_1 z_o + f_1(z_o - f_1)} = \frac{f_1^2}{z_o}$$

where $f_1$ is the focal length of each lens of the two-lens in-tandem Fourier transform pair and $z_0$ is the object distance before the first lens.

The foregoing relationship may then be extended to the array context. An array of lenslets, or cells, are formed by pitch d. A portion of light diverging from the object 112 is captured by each cell. Each cell in one array forms a two-lenslet subsystem with a cell in the other array of an array pair. For a solid angle of light from the object 112 that overfills a cell of width near pitch d, the input captured is approximately a Rect function which forms a Sinc-like function near the image of A at the intermediate transform plane defined by, or disposed at, the distance $z_{g1}$ from the second array in the array pair.

The second Fourier transform array pair 106 is placed after the first array pair 102 at gap distance optically equivalent to $t_g = 2*z_{g1}$. The configuration thus becomes symmetric. The imaging conjugate distances provided by each subsystem are the same. The images developed by all of the subsystems converge for image formation of the object 112, at distance $z_i$, to form image 118 (see, e.g., point A' corresponding to point A on the object 112). In such cases, the imaging relay becomes a 1:1 relay such that the image distance $z_i$ is substantially equal to the object distance $z_0$.

The intermediate images may be referred to as intermediate transform images of the input object 112, which occur at the intermediate transform plane near half the gap $t_g$, defined previously as distance $z_{g1}$.

The distance, or gap $t_g$, between the two array pairs 102, 106 is determinative of the imaging of a stack of cells. The cell stack includes four cells, one from each array 104, 108. Each cell stack may be considered a constituent sub-system of the lens system 100. The distance between the two array pairs 102, 106 is selected such that imaging is achieved for all rays entering the constituent sub-system at a common image conjugate distance. The distance, or gap $t_g$, increases as the object distance decreases (i.e., the object 112 becoming closer to the lens system 100). The distance, or gap $t_g$, goes to zero as the object distance goes to infinity (or very large distances relative to the dimensions of the lens system 100). In the example of FIG. 1, the two array pairs 102, 106 are spaced apart from one another by a gap 120. The distance, or gap $t_g$, for the function is thus non-zero. The gap 120 may be on an order of, or in the proximity of, the first and second common focal lengths.

The pitch of the lenslets 110 within the arrays 104, 108 governs the convergence of light from all of the lenslets 110. The lenslets 110 of the first array pair 102 have a pitch $d_1$, while the lenslets 110 of the second array pair 106 have a pitch $d_2$. The pitch is selected such that convergence of all optical information across all lenslets 110 of the arrays 104, 108 is achieved. An image is thus formed at the same image conjugate distance across all lenslets 110 of the array 104, 108. The lens system 100 is an example of an imaging relay in which the lenslets 110 of both array pairs 102, 106 have a common pitch. With the pitches $d_1$, $d_2$ equal to one another, the output of the lens system 100 may be telecentric.

Telecentric output may also be provided, on one side of the optical stack, in non-equal pitch cases, i.e., when $d_1$ does not equal $d_2$. In such cases, the pitches of the lenslets 110 in each array 104 of the first array pair 102 are equal to one another, and the pitches of the lenslets 110 in each array 108 of the second array pair 106 are equal to one another. The function simplifies as follows:

$$d_2 = \frac{d_1 z_2 (f_1 + z_1)}{(f_2 + z_2) z_1}$$

The gap $t_g$ is as follows:

$$t_g = z_{g1} + z_{g2},$$
$$\text{where } z_{g1} = \frac{f_1^2}{z_1} \text{ and } z_{g2} = \frac{f_2^2}{z_2}.$$

In such case, the pitches are configured such that $d_1 = d_{1b} < d_{2b} = d_2$.

Non-telecentric imaging, on both sides of the optical stack, may also be provided. The rays may be smoothly bent through the lens system 100 by adjusting the respective pitches of the cells within the arrays 104, 108. The lenslets 110 of the arrays 104, 108 may thus be registered (or aligned) with one another or non-registered. In one example, the pitches of all four arrays differ from one another. The pitch $d_1$ for the lenslets 110 becomes $d_{1a}$ and $d_{1b}$ for the first and second arrays 104 of the first array pair 102. The pitch $d_2$ for the lenslets 110 becomes $d_{2a}$ and $d_{2b}$ for the first and second arrays 108 of the second array pair 106. In one positive magnification case, $d_{2b} > d_{2a} > d_{1b} > d_{1a}$. The function then may be expressed as follows (with $z_{g1}$ and $z_{g2}$ defined as set forth above):

$$d_2 = \frac{d_{2b} f_2 z_1 + d_{1b} f_1 z_2 + d_1 z_1 z_2}{z_1 (2f_2 + z_2)}$$

In such case, the pitches are configured such that $d_1 < d_{1b} < d_{2b} < d_2$.

As shown by the examples described above, the gap $t_g$ is determinative of the imaging of each subsystem of cells, while the relative pitches of the arrays govern the convergence from all the cell subsystems.

The focal lengths of the cells within the arrays 104, 108 may also be used to adjust the image conjugate distance. Non-unity conjugate distances may be achieved when the focal lengths of the lenslets 110 within the arrays 104 are not equal to the focal lengths of the lenslets 110 within the arrays 108. In the example of FIG. 1, the focal lengths of the lenslets 110 within the arrays 104 and 108 are equal to one another.

The term "equal" is used herein to mean exactly equal and effectively equal. Effectively equal may include, for instance, parameters that are equal within a reasonable margin of error, such as a manufacturing tolerance. The parameters values thus need not be exactly equal (e.g., slightly offset) to be considered "equal" as that term is used herein. Any of the parameters described herein as equal in some examples may alternatively be "substantially equal" in other cases. Substantially equal parameter values may be intentionally or unintentionally offset by a slight amount that results in a discernable (e.g., detectable), but insignificant, effect on system output. Any of the parameters described herein as equal in some examples may alternatively be "about equal" in other cases. About equal parameter values may be intentionally or unintentionally offset by a slight amount that results in a discernable (e.g., detectable) effect on system output that may be considered significant in some applications but insignificant in other applications. For example, a slight de-focusing of system output resulting from about equal parameters may be significant in the context of a fingerprint reader, a microscope, or photolithography, but insignificant in the context of a printer or facsimile machine.

Distances referenced herein, such as the width of the gap 120, may differ in practice in accordance with the refractive index of the transmission medium. For example, the above-described functions specify a distance for the gap parameter in connection with transmission through an air gap. The actual width of the gap 120 may differ from the air gap distance if the light is propagating through a medium other than air when traversing the gap 120. The gaps and other distances may thus be optically equivalent distances. In cases using an optical medium other than air, the inner lenslet focal lengths may be adjusted to account for change in curvature required to maintain the Fourier Transform function of each pair. Increase in refractive index in the gap implies smaller lenslet curvature to maintain substantially equal effective focal length for an in-tandem MLA pair. Further, such practice is useful when it is desired to laminate both MLA pairs to form an optical stack that includes a monolithic optical stack without an air gap.

Optical terms such as "collimated", "focused", etc., are used herein to include both the exact condition described by the term as well as conditions near the exact condition. For example, light is considered to be collimated if the light rays are collimated to an effective extent for purposes of the imaging application or usage scenario involved. The resolution of the viewer may thus be taken into account when evaluating whether the optical condition (e.g., collimated, focused) is present.

Figure 2:
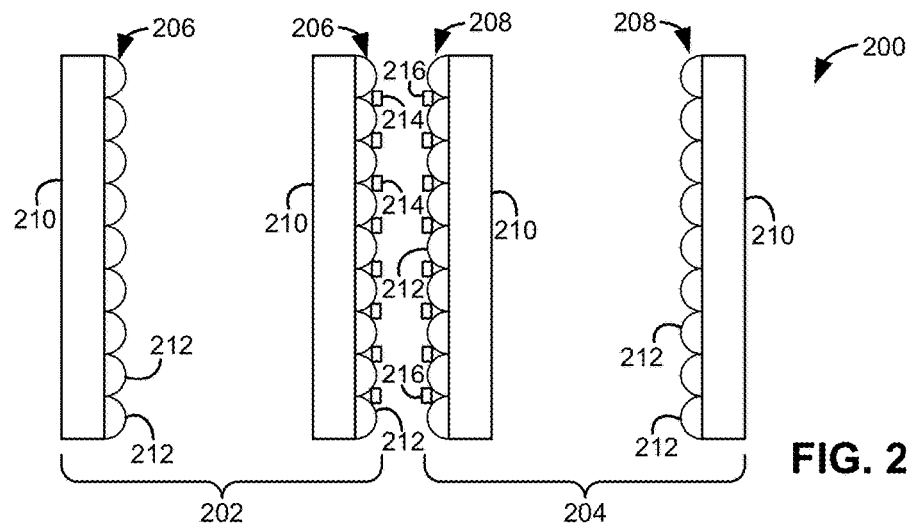
FIG. 2 is a schematic, side view of the lens system of FIG. 1 in accordance with an example having a respective in-tandem pair of microlens arrays (MLAs) for each lens array assembly.

FIG. 2 depicts a side view of an MLA-based lens system 200 in accordance with one example. As in the examples described above, the lens system 200 includes two array pairs 202, 204. The array pair 202 includes arrays 206, and the array pair 204 includes arrays 208. In this example, each array 206, 208 is disposed on a respective substrate 210. The substrates 210 may or may not be similarly configured and constructed. In one example, each substrate 210 is composed of a glass substrate having a thin microlens layer replicated on one surface using UV-cure adhesive resin, which may be cured using ultraviolet light, and a mold master, and each substrate 210 may have a similar thickness.

Each array 206, 208 includes a set of lenslets 212. In one example, each substrate 210 and set of lenslets 212 is integrally formed via injection molding. Alternatively, the lenslets 212 may be formed separately from the substrate 210 and affixed or otherwise secured thereto. For example, the lenslets 212 may be formed, and then applied to the substrates 210 with optically clear adhesive. The pitch and focal length of the lenslets 212 may be equal or offset as described above. Other techniques for forming the lenslets 212 may be used.

Surfaces may be optically coated with anti-reflective (AR) coatings to minimize loss and scatter due to Fresnel reflections. In cases using UV-cure adhesives, a glass master may be utilized to minimize distortion. Other examples include injection molding in a homogenous polymer, such as acrylic or polycarbonate, compression molding of polymer sheets, and nanoprinting. For compression molding, a nickel shim may be formed of a master negative using an electroform nickel process. A master may also be formed using diamond machining, such as plunge cutting a rotating cutter having a profile form for each lenslet, or diamond turning each lenslet. For high accuracy and fill factor, a lithography based glass etching technique may be used to fabricate the MLA master.

Various profiles may be used for each lenslet 212. For example, the lenslets 212 may have aspheric or conic profiles. The extent or degree to which the profiles are aspheric or conic may vary. In some cases, the lenslets 212 may have profiles with conic constants directed to reducing aberrations and/or allow the lens system to accommodate higher numerical apertures (NA).

The arrays 206, 208 are oriented symmetrically about the intermediate transform plane (FIG. 1). Each lenslet 212 of the arrays 206, 208 is a plano-convex structure. The planar side of each structure is adjacent the respective substrate 210. The curved side of each structure is disposed on an inward facing side of each array 206, 208 in the example of FIG. 2. The orientation of the lenslets 212 may vary from the example shown. One example is described below in connection with FIG. 3.

The lenslets 212 may be arranged in a variety of two-dimensional patterns. For example, the lenslets 212 may be disposed in a hexagonal array, a square array, or other arrangement. The lateral shape of each lenslet 212 may vary accordingly.

One or more of the arrays 206, 208 may be pattern or aperture masked. The aperture masking may be directed to limiting the acceptance of the lens system and/or reducing scattered light. Pattern masking may be directed to blocking ambient or other spurious light from being processed by the lens system 200. For instance, ambient light at high angles of incidence upon the lens system 200 is blocked. Blocking the high angle incident light may prevent the spurious light from hopping to a neighboring subsystem of cells. In the example of FIG. 2, the lens system 200 includes aperture stops 214 along the inner array 206 of the first array pair 202, as well as aperture stops 216 along the inner array 208 of the second array pair 204. Fewer, additional, or alternative aperture stops 214, 216 may be provided. For example, other lens systems may not include the aperture stops 216. Aperture stops may be disposed at any one or more of the layers.

The aperture stops may be provided for other purposes. For example, the aperture stops may address aberrations in the lenslets of the arrays.

Aperture masking may be accomplished by using a lithographed aperture hole array layer, such as patterned deposited thin metal oxide or metal, on top of or underneath the replicated layer as by replicating over an aperture-patterned substrate surface, or one or more patterned sheets disposed within the optical stack, e.g., near the inner arrays.

The aperture stops 214, 216 may be provided via a discrete sheet or other layer disposed along the respective array 206, 208. For example, an opaque sheet secured to, or disposed along, the array 206 may include an array of apertures to define the aperture stops 214. Alternatively or additionally, the pattern masking may be provided via a layer deposited or otherwise formed on the respective substrate 210. The layer may be patterned to define the aperture stops 214, 216 before the formation of the lenslets 212.

The aperture stops 214, 216 may be embedded in, or otherwise integrated with, the lenslets 212. For instance, the material of each aperture stop 214, 216 may be deposited on the substrate 210 and then patterned before and/or in connection with the formation of the lenslets 212. Further, a perforated or 'honeycomb' sheet of limited thickness may be disposed between the pairs.

Figure 3:
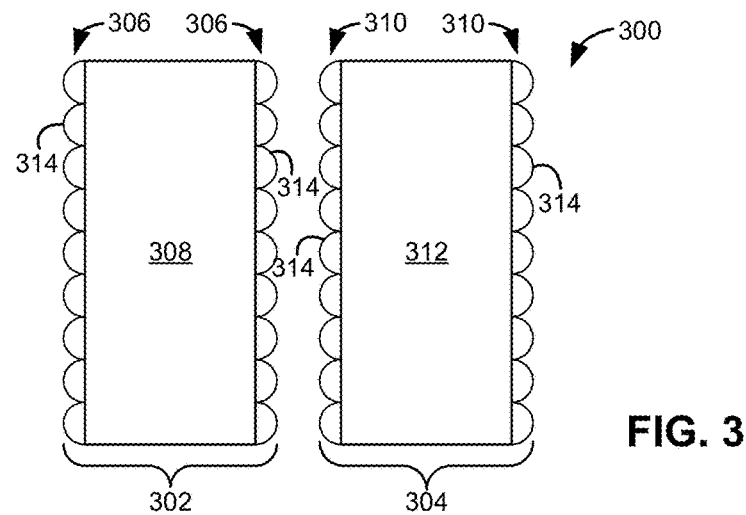
FIG. 3 is a schematic, side view of a MLA-based lens system in accordance with another example.

FIG. 3 depicts another example lens system 300 having array pairs 302, 304. In this case, arrays 306 of the pair 302 are disposed on opposite sides of a substrate 308. Arrays 310 of the pair 304 are disposed on opposite sides of another substrate 312. Each array 306, 310 includes lenslets 314, each of which includes a plano-convex structure. The curved surface of each lenslet 314 faces inward or outward in accordance with the side of the substrate 308, 312 on which the lenslet 314 is disposed.

The lenslets 314 may be arranged, shaped, formed, and otherwise configured as described above. The lens system 300 may have alternative or additional aspects in common with the examples described above. For example, in some cases, the lens system 300 includes aperture stops on one or more of the arrays 306, 310.

The arrays of the examples of FIGS. 2 and 3 may be separated from one another by air. Other media may be used.

For example, low refractive index adhesive or laminate materials may be disposed between the arrays.

Lenslet orientations other than those shown in FIGS. 2 and 3 may be used.

The lens systems may differ from the examples of FIGS. 2 and 3 in other ways. For example, the arrays of each pair may be in contact with one another. In four-substrate cases, the arrays may be in contact as a result of the thickness of the inner substrates.

Additional substrates or other structures may be used in other examples. For example, two substrates may be disposed before and after the array assemblies of FIG. 3 to provide, for instance, additional structural support or protection.

A four layer MLA stack may be configured to accommodate conjugate distances from infinity to close proximity. However, the gap distance $t_g$ may increase substantially for object distances approaching the focal length of the first array. In such cases, additional, outer MLAs may be added in order to enable the inner gap distance to be substantially reduced, and further provide a focus NA having no gaps. Further, the outer MLAs may provide added freedom in design as each surface profile may be tailored to improve optical performance.

Figure 4:
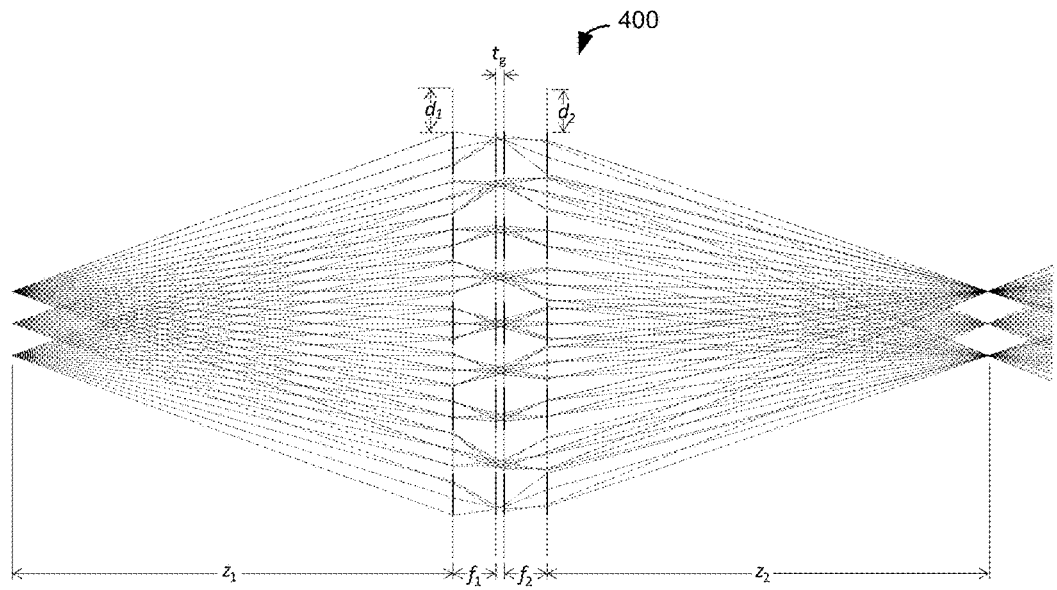
FIG. 4 is a ray trace diagram for a lens system having two lens array assemblies in accordance with one example.

FIG. 4 is a ray tracing diagram to provide a paraxial illustration for a four-layer lens system 400 that may be used as, for instance, an imaging relay 400. The pitch, focal length, and conjugate distance parameters of the lens system may be selected in accordance with the function described above to achieve, for instance, 1:1 relay imaging.

Figure 5:
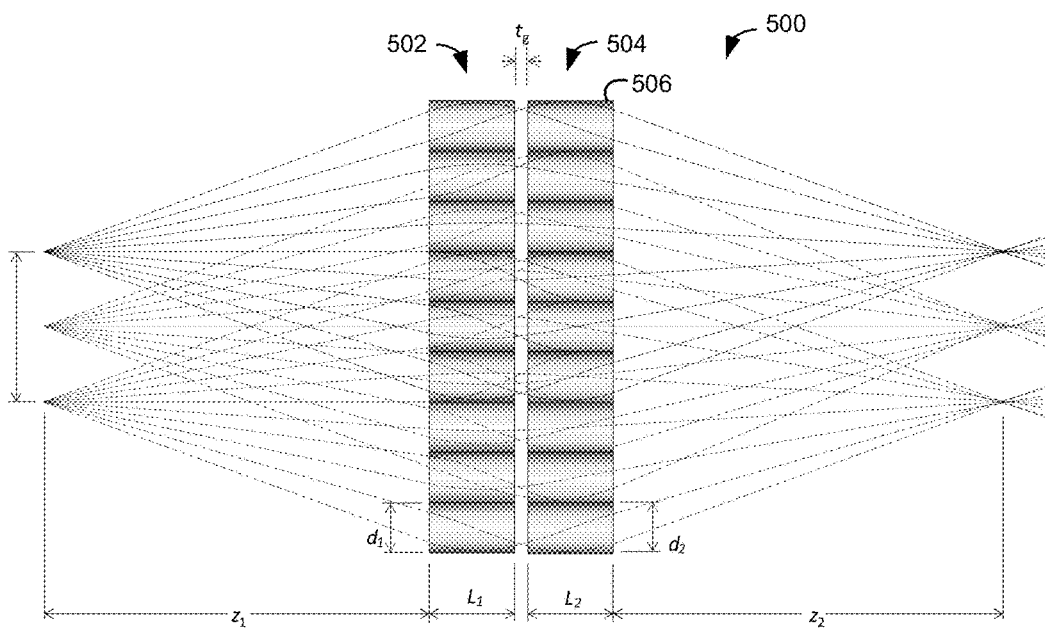
FIG. 5 is a ray trace diagram for a lens system in accordance with an example in which each lens array assembly includes a respective array of graded-index microlensing structures.

FIG. 5 shows a GRIN-based lens system 500 in which two lens array assemblies 502, 504 are positioned relative to one another for relay imaging. Each assembly 502, 504 includes an array of GRIN microlensing structures 506.

Each structure 506 provides one of the cells of the lens array assembly 502, 504. To that end, each structure 506 is configured to exhibit, or act as, a pair of Fourier transform lenses. A parabolic refractive index profile enables each cell to function as a series of two in-tandem Fourier transform pairs, in order to satisfy the above-described constraints of (1) image conjugate formation for each cell and (2) convergence of imaging from multiple cells. Each assembly 502, 504 may thus be configured as a plate having a thickness that provides the equivalent function of the above-described Fourier transform cells formed via a lenslet pair.

EMA glass may be used to block light from encountering the edge of an adjacent cell. Other absorbing coatings or layers may be used.

For given total track length (TTL) between image conjugates, the object and image distances may be placed by design to coincide with the outer faces of the GRIN lens length, thus having image conjugates at the outer surfaces, or may be placed at an air gap distance from each of the two outer surfaces. However, the structures 506 are unlike previous GRIN arrays used for image relay or image transfer that have been based on designing a single GRIN lens length, thus only functioning for a specific pair of conjugate distances. By realizing herein that a fundamental element required in enabling the formation of images in array-based imaging is a series of two Fourier Transform (FT) equivalent sub-systems within each cell of the array, and the Fourier Transform equivalent length for a GRIN lens may be defined as the length for which a collimated input beam forms a focus at the second output surface of the GRIN lens, an air gap (zero to non-zero) defined by image conjugate relations may be disposed between the two Fourier Transform equivalent length GRIN arrays in order to provide array-based relay imaging, which may add versatility of the system to be adjusted for any pair of equal image conjugate distances using two FT-equivalent length GRIN arrays which have the same effective focal length, and further may be adjusted to support unequal conjugate distances by use of two FT equivalent length GRIN arrays which have different focal length. Such arrays may be made thinner by use of GRIN fibers or drawing an array of GRIN rods into a boule having accurate placement of array spacing, then slicing and polishing faces, in a similar fashion as coherent fiber optic faceplates are fabricated, but with tight control of pitch layout. Further, while a GRIN lens is a lens which exhibits a continuous lensing effect or optical power anywhere along its length, a Fourier Transform equivalent subsystem may also be formed using two or more lens arrays. While a single lens array may be used to form an array of output images which appear to be Fourier Transforms in terms of intensity, these are not Fourier transforms in terms of phase, or telecentrically corrected upon output. The simplest form of an FT equivalent subsystem would then include two lenses having the same focal length placed in tandem at a separation distance equal to the effective focal length. However, it is clear from the GRIN lens FT equivalent length case explained above, that more than two lenses having various optical power may be used in series to achieve the equivalent function of a FT-equivalent subsystem. The simplest case of using microlens arrays to achieve array-based imaging involves use of two in-tandem Fourier Transform pairs of microlenses, having an air gap or optical path length gap distance defined by image conjugate relations which will be defined below. In such way, any lens array, including microlens arrays, GRIN lens arrays, or GRIN microlens arrays may be utilized to form an imaging relay, as explained below.

Figure 6:
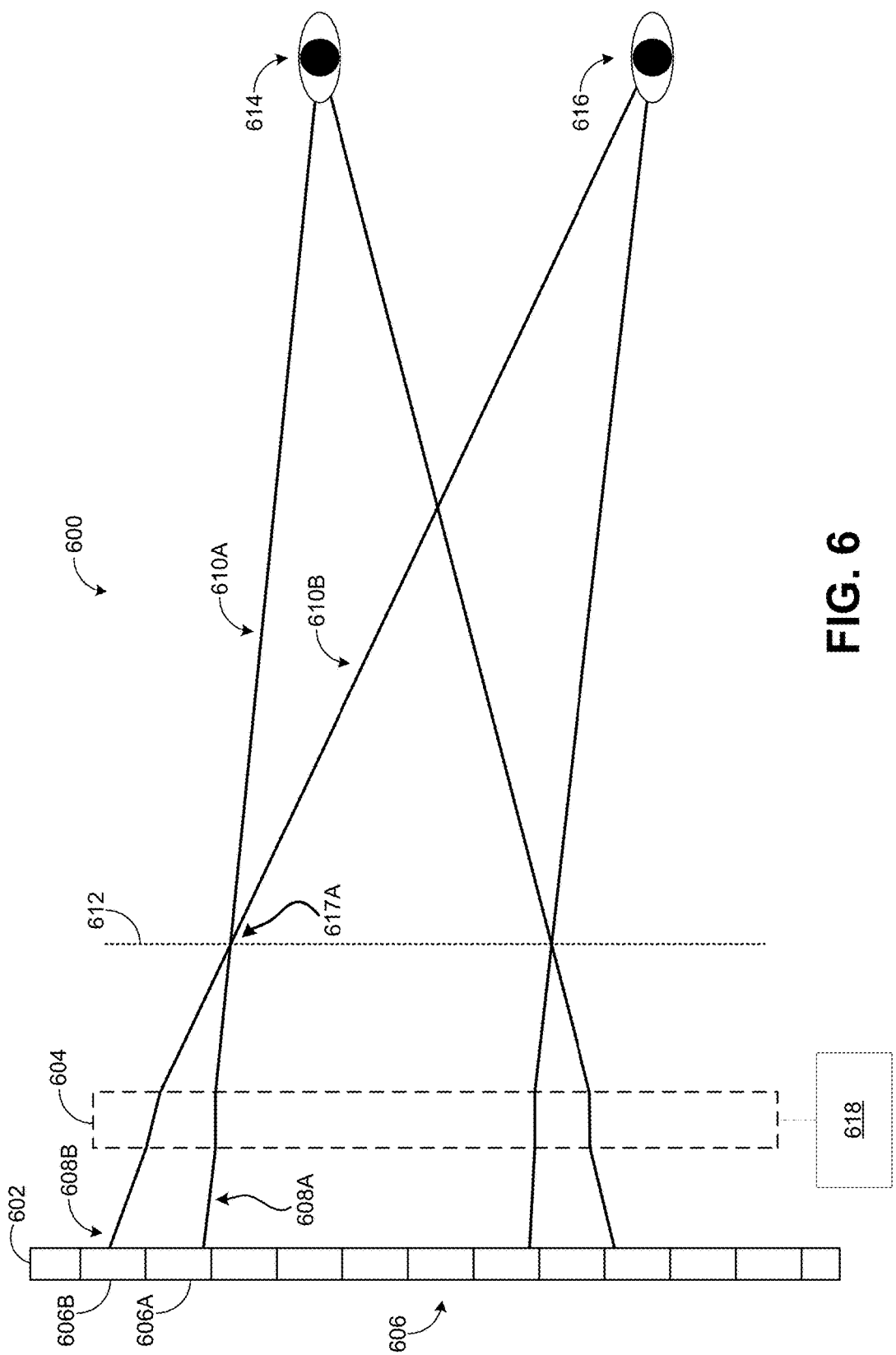
FIG. 6 shows an example display device including a Fourier transform array.

FIG. 6 schematically shows an example display device 600 that includes an image source 602 from which encoded image light is output and transmitted through an FT array 604 to thereby form a floating image viewable from a plurality of different vantage points. FIG. 6 depicts, for a first encoded region 606A of a plurality of encoded regions 606 of image source 602, encoded image light 608A output from the first encoded region and received by FT array 604, which is positioned to receive encoded image light from the plurality of encoded regions. Encoded image light 608A is then transmitted through the FT array, which thereby decodes the encoded image light and outputs decoded image light 610A. Decoded image light 610A forms a portion 617A of a floating image focused at a focal plane 612. Decoded image light from other encoded region(s) of the plurality of encoded regions 606 may combine with decoded image light 610A to form a complete floating image. The floating image is viewable from a first vantage point 614, at which a viewer's eye is represented. While the example depicted in FIG. 6 shows two light rays forming the floating image as viewed from first vantage point 614, any suitable number of light rays may form the floating image from the first vantage point. In some examples, FT array 604 may output a substantially continuous field of light rays to first vantage point 614. Details regarding the encoding of light output by image source 602, and the decoding of encoded image light performed by FT array 602, are described below with reference to FIGS. 12-14.

The floating image is further viewable from a plurality of other vantage points in addition to first vantage point 614. As an example, FIG. 6 shows a second vantage point 616 from which the floating image may be viewed. From the second vantage point 616, decoded image light 610B originates from a second encoded region 606B from which encoded image light 608B is output. The portion 617A of the floating image formed by decoded image light 610B (when viewed from vantage point 616) is the same portion 617A of the floating image formed by decoded image light 610A (when viewed from vantage point 614). In other words, different regions of the image source output light that makes up the same portion 617A of the floating image, and which of these different regions supplies light to the eye depends on the vantage point from which the eye views the floating image.

As can be seen from the example depicted in FIG. 6, decoded image light forming the floating image at focal plane 612 may originate from different encoded regions of the plurality of encoded regions 606 for different vantage points from which the floating image is viewed. As described above, the portion 617A of the floating image as viewed from first vantage point 614 is formed by decoded image light 610A originating from encoded region 606A, which differs from encoded region 606B from which decoded image light 610B originates and forms the portion 617A of the floating image as viewed from second vantage point 616. As the floating image is viewable from a plurality of vantage points (e.g., within the field-of-view of FT array 604) including vantage point(s) other than first and second vantage points 614 and 616, decoded image light forming the floating image may originate from different sets of encoded regions of the plurality of encoded regions 606 for different vantage points, respectively.

Image source 602 may assume a variety of suitable forms. As one example, image source 602 may include a display image output from a display. Any suitable type of display may be used to provide the display image, including but not limited to a two-dimensional backlit liquid crystal display (LCD) and organic light-emitting diode (OLED) display. In some examples, the display may be operated to output a sequence of display images to thereby provide animated image content (e.g., video). In other examples, image source 602 may include a static image provided by a (e.g., encoded) film or other light emitting/transmitting/reflecting surface.

FT array 604 may implement a Fourier transform of encoded image light output by image source 602 to thereby decode the encoded image light and provide decoded image light forming the floating image at focal plane 612. To this end, FT array 604 may assume various suitable forms. For example, FT array 604 may include at least a portion of one or more of lens systems 100, 200, 300, 400, and 500 of FIGS. 1-5, respectively. More specifically, FT array 604 may include a lens array pair such as second pair 106 of lens system 100, array pair 208 of lens system 200, array pair 310 (e.g., with substrate 312) of lens system 300, and/or lens assembly 504 of lens system 500. Thus, FT array 604 may include a lens array pair and/or a graded-index microlens structure, and further may implement a Fourier transform from position space to angle space. Encoded content accordingly may be provided by an image source such as image source 602 to second pair 106 of lens system 100, array pair 208 of lens system 200, array pair 310 (e.g., with substrate 312) of lens system 300, and/or lens assembly 504 of lens system 500.

Focal plane 612 may represent a reconvergent plane at which a 2D floating image is formed. Further, various portions of encoded content within each encoded region 606 may converge at different apparent focal planes, such that decoded light forms a converged 3D floating image. Further still, an array of phase delays may be disposed in between image source 602 and FT array 604, such as via use of a spatial light modulator (SLM), such that both intensity and phase of encoded content within each encoded region may be controlled for cases using coherent illumination.

Figure 7:
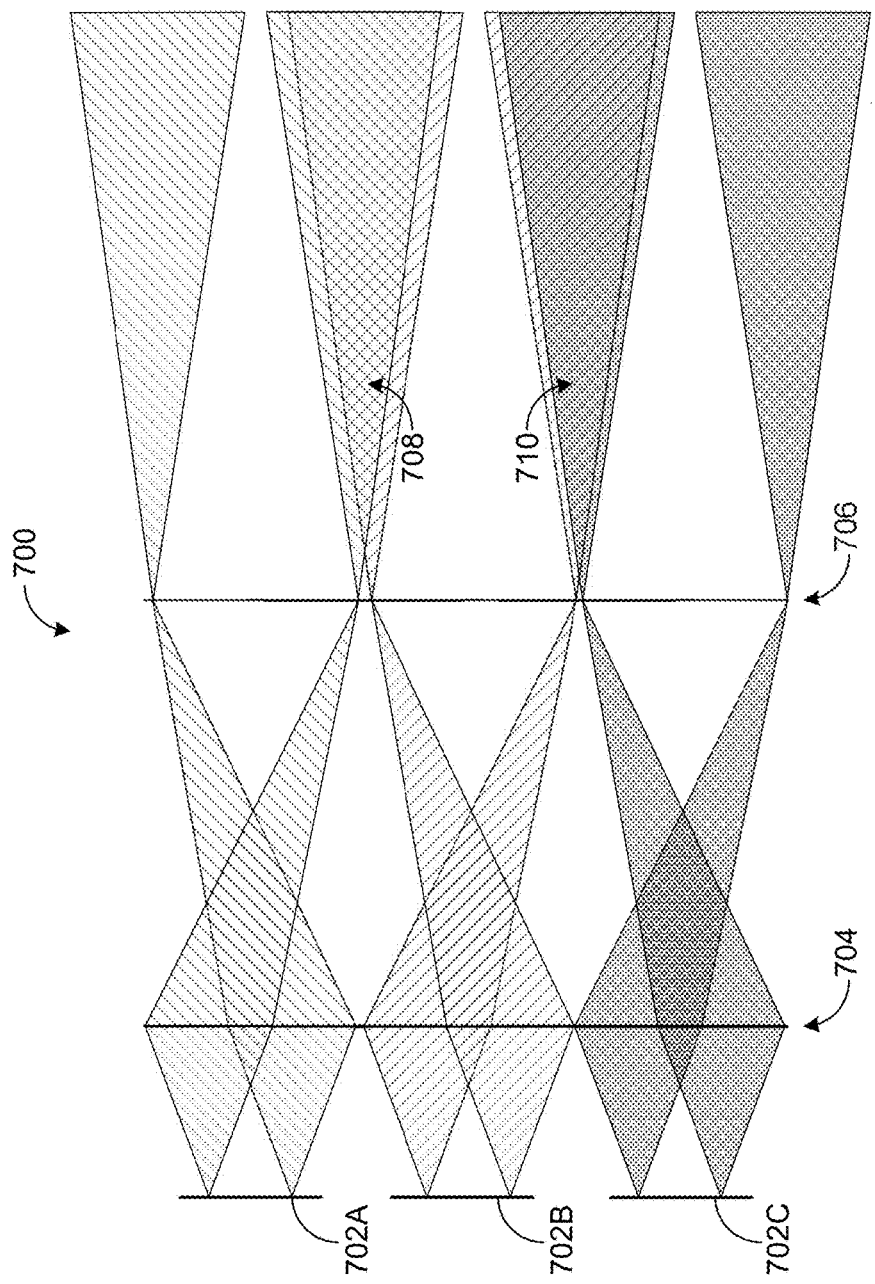
FIG. 7 shows an example display device including three displays whose outputs are optically combined using a lens array.

In some implementations, image source 602 may include a stitched display image formed by optically combining output from two or more displays. To this end, FIG. 7 shows an example display device 700 that includes three displays 702A, 702B, and 702C whose outputs are optically combined using a lens array. In particular, a first lens array 704 is positioned to receive image light from displays 702 and transmit the image light to a second lens array 706 positioned to receive the image light from the first lens array. As examples, FIG. 7 shows a first region 708 at which output from first and second displays 702A and 702B is stitched, or optically tiled, and a second region 710 at which output from second and third displays 702B and 702C is stitched. First and second regions 708 and 710 may be substantially continuous regions in which a plurality of light rays from multiple displays are combined. While the example shown in FIG. 7 depicts optical stitching and tiling of three displays, any suitable integer number of displays equal to or greater than two may be stitched and tiled in this manner. Further, first lens array 704 may be considered as an array of projection lenses, and displays 702 may be considered analogous to or replaceable with an array of projection displays. Still further, image source 602 may include image sources showing static content, such as from a display displaying a fixed image or as from lithographed, screened, or printed matter, or may include image sources which may be updated over time, such as time-sequentially updated content displayed on an electronically addressable display, such as video-rate content, or further still may include image sources having one or more layers of electronically addressable displays, such stack having thickness, which may provide more than one conjugate z-distance.

First lens array 704 inverts the image light output from displays 702, which thus may output encoded image light that is inverted relative to the image light that ultimately forms a viewable floating image. Second lens array 706 performs telecentric correction of the image light received from first lens array 704. To this end, second lens array 706 may be a high fill-factor lens array configured to telecentrically correct pointing angle v. position, which may enable the formation of a larger, relatively higher resolution image source that can be employed as an input display object placed at an intermediate transform plane optically upstream of the latter portion of an array-based imaging optical stack. As one example with reference to FIG. 6, the higher resolution image source may be employed as image source 602, in which case stitched, encoded image light generated by display device 700 may be transmitted to FT array 604 to thereby produce a stitched, decoded image. Additional detail regarding telecentric correction in an in-tandem pair of lens arrays is described below with reference to FIG. 16.

Figure 8:
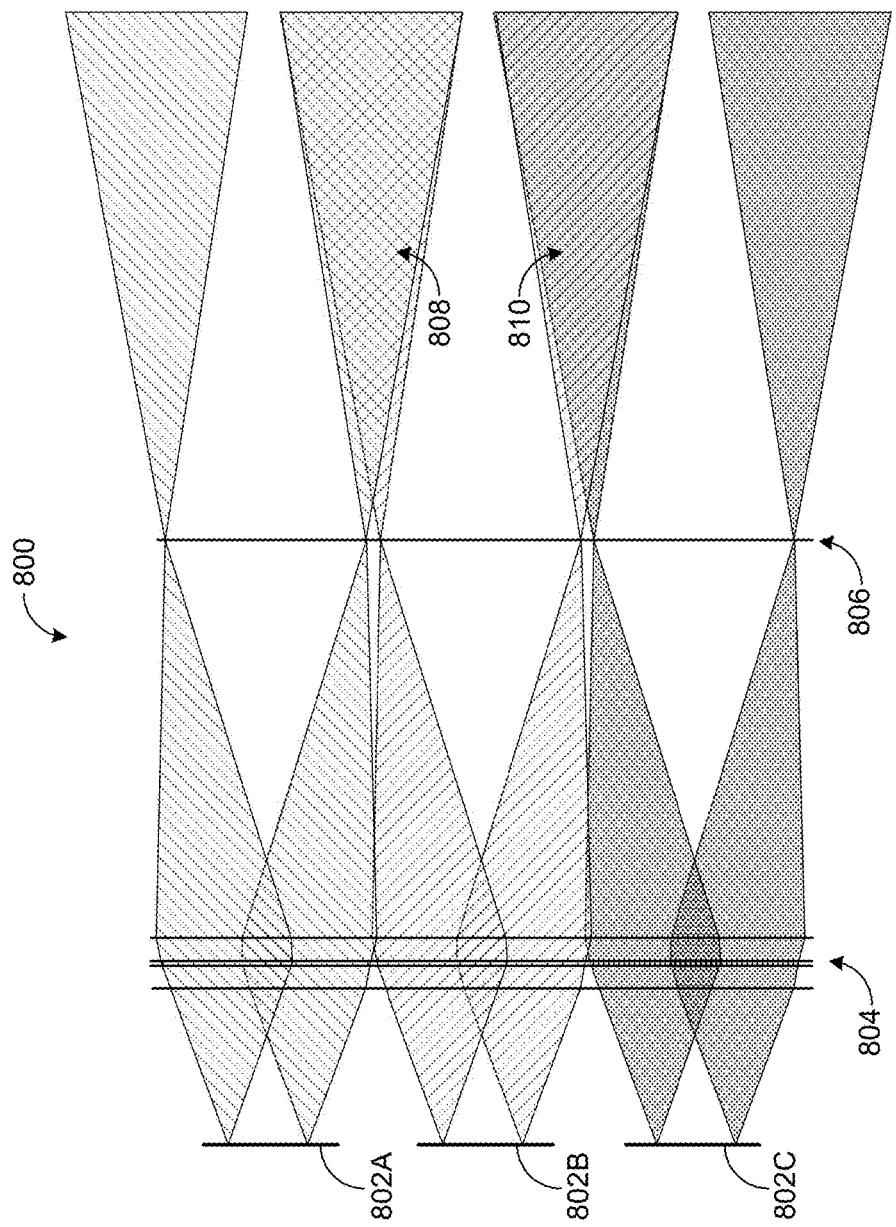
FIG. 8 shows an example display device including three displays whose outputs are optically combined using array-based imaging.

In some implementations, output from two or more displays may be optically combined via array-based imaging. To this end, FIG. 8 shows an example display device 800 that includes three displays 802A, 802B, and 802C whose outputs are optically combined using array-based imaging. In particular, a reconvergence sheet 804 is positioned to receive image light from displays 802 and transmit the image light to a lens array 806 positioned to receive the image light from the reconvergence sheet. As examples, FIG. 8 shows a first region 808 at which output from first and second displays 802A and 802B is stitched, and a second region 810 at which output from second and third displays 802B and 802C is stitched. First and second regions 808 and 810 may be substantially continuous regions in which a plurality of light rays from multiple displays are combined. While the example shown in FIG. 8 depicts optical stitching and tiling of three displays, any suitable integer number of displays equal to or greater than may be stitched and tiled in this manner.

Reconvergence sheet 804 receives non-inverted image light output from displays 802 and performs tiling of the output. Reconvergence sheet 804 may include lens arrays of dissimilar pitch which define a repeating grid of image conjugate pairs for each display 802, such that each display is aligned at an object position, so as to tile display images seamlessly at the plane of lens array 806. Lens array 806 performs telecentric correction of the light output by reconvergence sheet 804 to enable the formation of a larger, relatively higher resolution image source that can be employed as an input display object placed at an intermediate transform plane optically upstream of the latter portion of an array-based imaging optical stack. As one example with reference to FIG. 6, the higher resolution image source may be employed as image source 602, in which case stitched, encoded image light generated by display device 800 may be transmitted to FT array 604 to thereby produce a stitched, decoded image. In such case, the tiled display plane formed just after lens array 806 may be used as image source 602.

Figure 9:
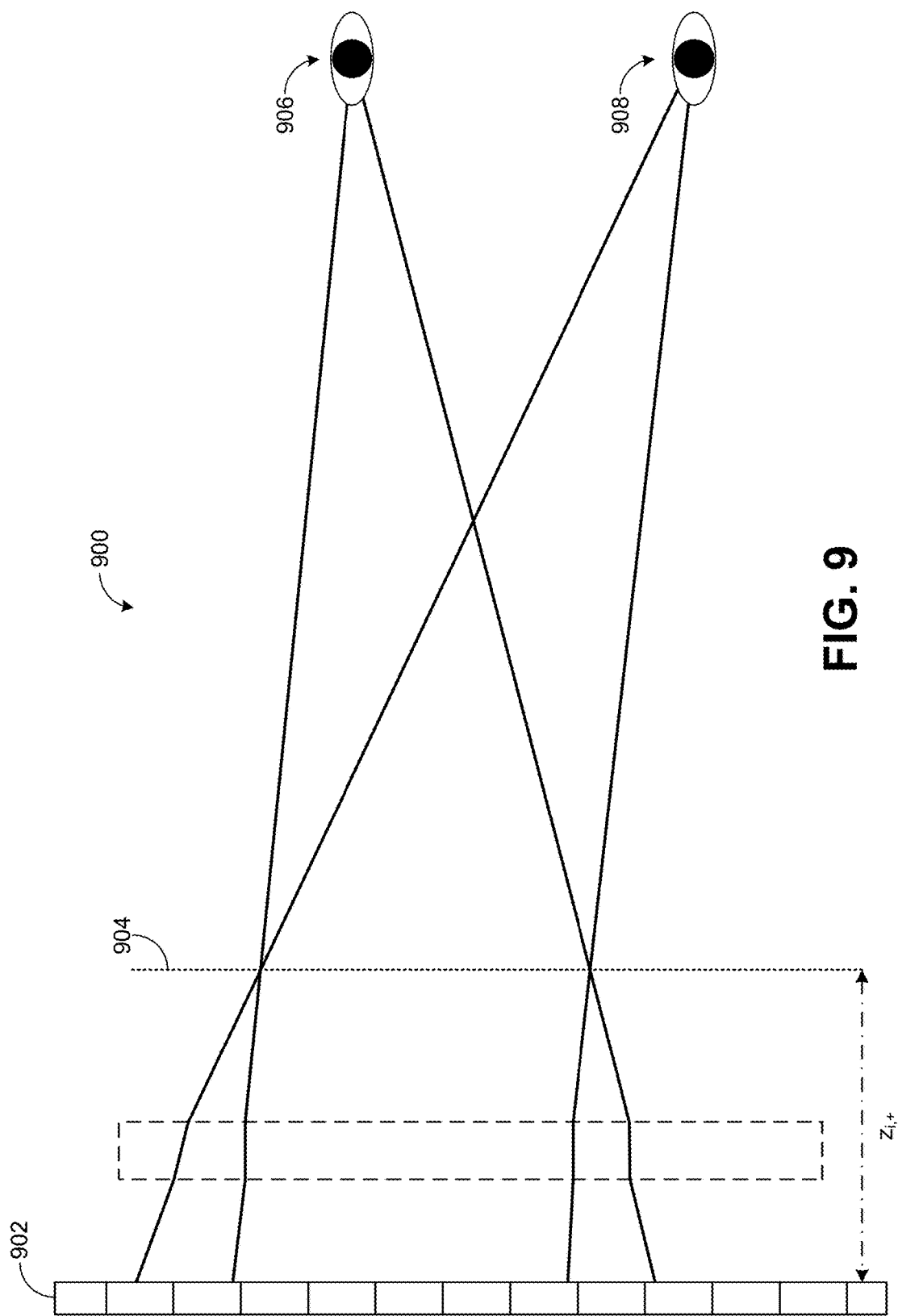
FIG. 9 shows an example display device configured to produce a floating image having a positive apparent z-distance.

One or more of the lens systems and display devices described above may be configured to produce a floating image at a variety of apparent z-distances relative to an image source. FIG. 9 shows an example display device 900 that is configured to produce a floating image having an apparent z-distance $z_{i,+}$ that is positive relative to an image source 902. As the light rays that form the floating image are focused at a focal plane 904 located at the apparent z-distance $z_{i,+}$, the floating image appears to float in front of image source 902 as viewed from one or more vantage points, such as vantage point 906 and/or vantage point 908.

The floating image may be a two-dimensional (e.g., planar) or three-dimensional image that appears to have depth. A 3D floating image has different image portions appearing at different z positions for multiple vantage points, thus having content forming a combination of apparent z-distances. For simplicity, 3D images of the present disclosure may be referred to as having a z-distance, which may be adjusted forward or backward. In practice, when a 3D image is z-shifted forward or backward, all the different z-distances of the different content portions will shift accordingly.

Figure 10:
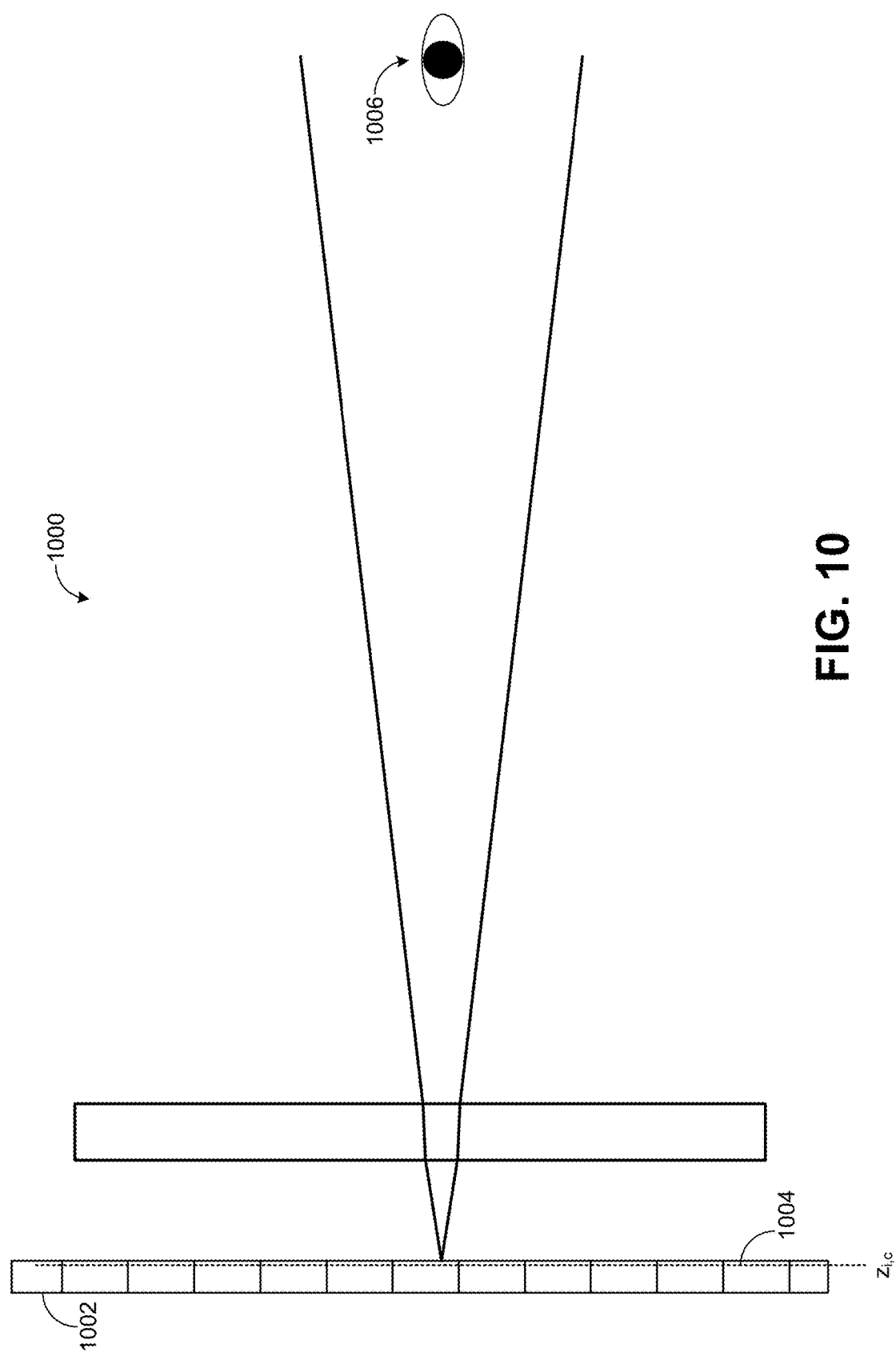
FIG. 10 shows an example display device configured to produce a floating image having an apparent z-distance that is coplanar with an image source.

A floating image may be produced at other locations relative to an image source. As another example, FIG. 10 shows an example display device 1000 that is configured to produce a floating image having an apparent z-distance $z_{i,c}$ that is coplanar with an image source 1002. As light rays that form the floating image are focused at a focal plane 1004 that is coplanar with the plane of image source 1002, the floating image appears to originate from the image source as viewed from one or more vantage points such as vantage point 1006. The floating image may be a two-dimensional (e.g., planar) or three-dimensional image that appears to have depth, which may thus include decoded image light converging at one or more z-distances to produce image content within the floating image.

Figure 11:
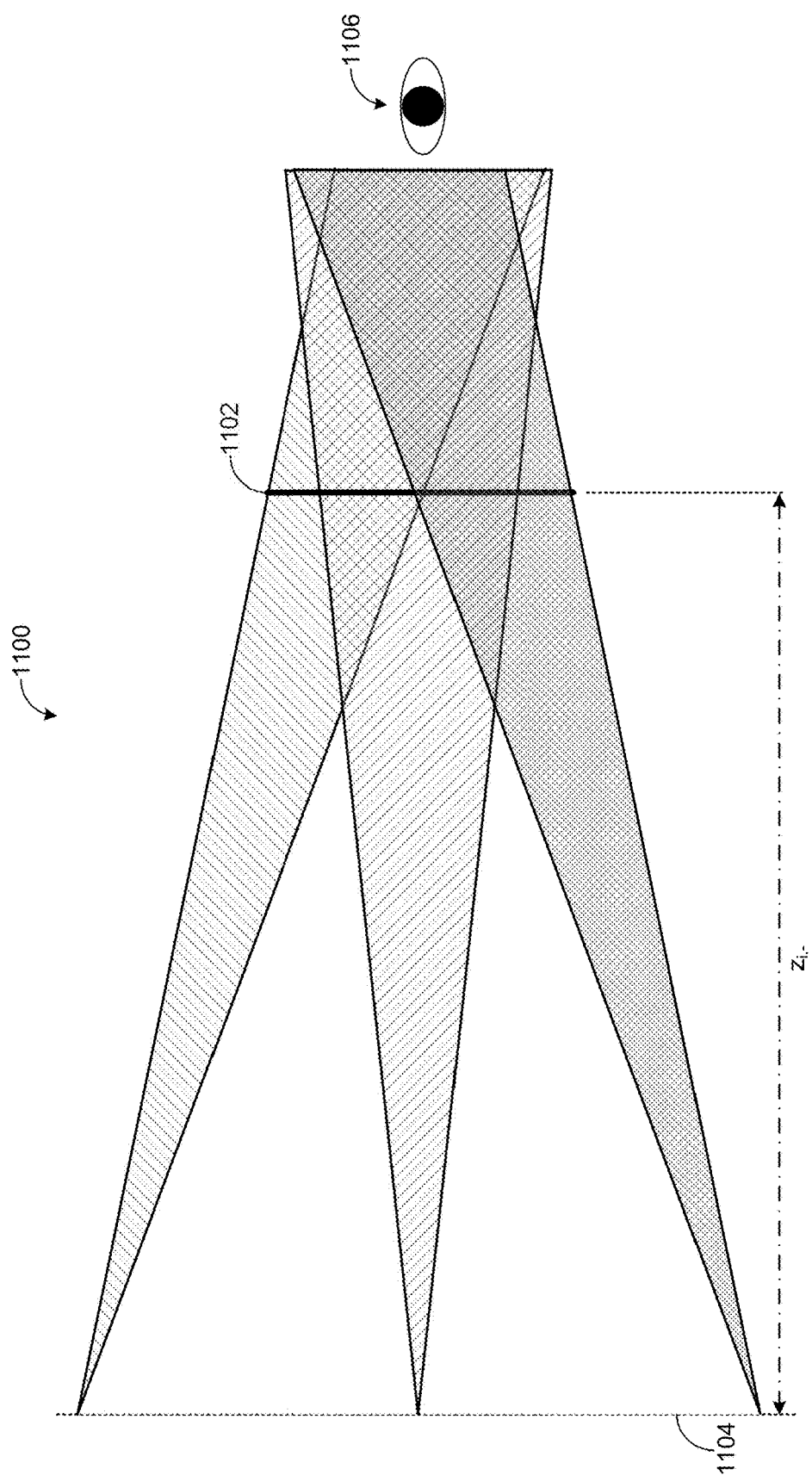
FIG. 11 shows an example display device configured to produce a floating image having a negative apparent z-distance.

As yet another example of the potential placement of floating image relative to an image source, FIG. 11 shows an example display device 1100 that is configured to produce a floating image having an apparent z-distance $z_{i,-}$ that is negative relative to an image source 1102. As light rays that form the floating image appear to be focused at a focal plane 1104 located at apparent z-distance $z_{i,-}$, the floating image appears to be located behind image source 1102 as viewed from one or more vantage points such as vantage point 1106. The floating image may be a two-dimensional (e.g., planar) or three-dimensional image that appears to have depth. Further, in view of the above, "floating image" as used herein may refer to an image that appears in front of, coplanar with, or behind an image source.

A variety of approaches may be used to achieve a desired z-distance of a floating image relative to an image source. As described above, various optical parameters of a lens system may be selected to achieve a desired floating image z-distance, including but not limited to lens focal length, lens pitch, and/or the distance between adjacent lens arrays. To achieve a negative floating image z-distance, one or more lens arrays may be placed behind the outer surface of a display—e.g., between a backlight and a cover layer of the display. For emitting display types, such as OLED, a slightly reduced thickness of an FT-pair (with or without a slight modification of the focal length), may be used in order to achieve desired imaging performance. As another example, a desired floating image z-distance may be achieved by selecting the pitch of encoded regions (e.g., the space between adjacent encoded regions such as encoded regions 606A and 606B, both of FIG. 6) relative to the lens pitch of one or more lens arrays. As yet another example, an actuator may be used to dynamically vary the position of one or more lens arrays relative to an image source. Returning briefly to FIG. 6, the potential inclusion of an actuator 618 operatively coupled to FT array 604 is shown. Actuator 618 may be configured to adjust a position of FT array 604 relative to image source 602 to thereby adjust an apparent z-distance of the floating image produced by display device 600. Actuator 618 may assume any suitable form, such as that of a piezoelectric device or nanomotor. Still further, for examples in which an image source includes a display image provided by a display, the display may be driven to vary its output (e.g., encoded content) to thereby adjust the focal convergence range of decoded ray bundles to adjust an apparent z-distance of a floating image. By adjusting both the position of FT array 604 relative to image source 602, as well as making corresponding adjustments to the encoded content within encoded regions, a floating image may form which exhibits convergence both optically and digitally. It will be appreciated that one or more of the mechanisms described above may be employed to vary the apparent z-distance of a floating image within a range of z-distances, and/or to switch the apparent z-distance to one or more of a z-distance that appears in front of, coplanar, and behind an image source.

In some implementations, one or more of the display devices described herein may cooperate with an image sensor to track the vantage point of a user and adjust operation in response to changes in the vantage point. For example, a visible light, infrared, and/or depth camera may be used to determine the position of one or both of a viewer's eyes relative to a display, which may be used to adjust the encoded content provided by the display. The encoded content may be adjusted to maintain a consistent appearance of a floating image as the position of the viewer's eyes changes, or to provide different floating images as the position changes (e.g., to provide a three-dimensional floating image or to increase the apparent three-dimensional structure of a three-dimensional floating image), among other purposes. Alternatively or additionally, the z-distance of optical element(s) such as FT array 604 relative to an image source may be varied (e.g., via actuator 618) in response to changes in viewer position. Alternatively or additionally, parts of an encoded image that will not reach the viewer's eyes may be deactivated to save power. Further, display device operation may be modified in response to other events identified via the image sensor, including but not limited to hand, head, and/or other body gestures made by a viewer.

Figure 12:
FIG. 12 shows an example image.
Figure 13:
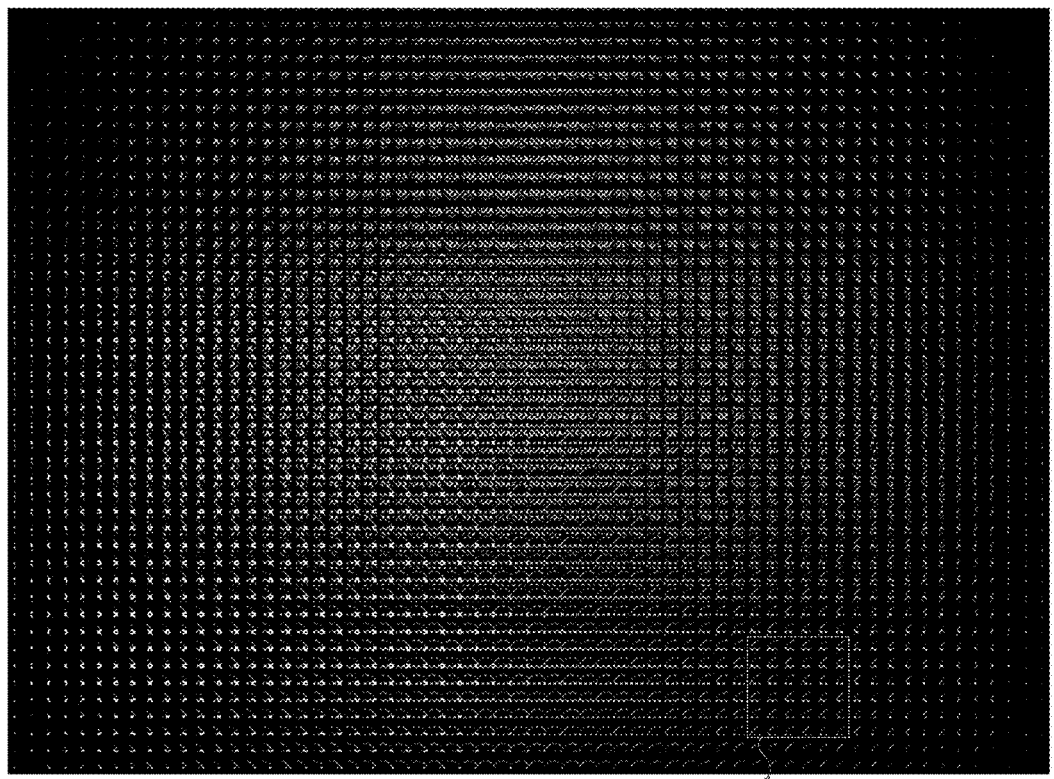
FIG. 13 shows an encoded image corresponding to the image of FIG. 12.
Figure 14:
FIG. 14 shows a magnified portion of the encoded image of FIG. 13.

As described above, an image source may include a plurality of encoded regions from which encoded image light is output, which may be decoded by suitable optical element(s) such as FT array 604 to produce decoded image light that forms a floating image viewable from a plurality of vantage points. As one example, FIG. 12 shows an example decoded image 1200 that may be formed by decoding a corresponding encoded image 1300 shown in FIG. 13. Encoded image 1300 includes a plurality of encoded regions such as encoded region set 1302, which includes six rows and six columns of encoded regions for a total of thirty-six encoded regions. A magnified view of encoded region set 1302 is shown in FIG. 14.

Continuing with this example, and with reference to FIG. 6, encoded region 1302 may correspond to encoded region 606A from which decoded image light is produced to form the portion 617A of the floating image viewable from first and second vantage points 614 and 616. As may be inferred from FIGS. 13 and 14, the portion 617A of the floating image is a reflected version of first encoded region 606A and/or encoded region 1302. Generally, portions of a floating image may be related to corresponding encoded regions of an encoded image source by one or more geometric transformations, including but not limited to translation, reflection, rotation, and/or dilation. Further, as shown in FIGS. 13 and 14, one or more encoded regions may include a portion, but not the entirety, of the corresponding image formed by decoded light produced with encoded image light from the one or more encoded regions. As a particular example, encoded image 1300 is encoded in a manner to endow image 1200 with an apparent positive z-distance of 25 mm.

While encoding may be used to make content appear in front, at, or behind an image source, encoding may be configured to produce a 3D reconstruction that appears floating. View angles that have overlapping content at different heights may be set to display content nearest the viewer for occluded objects, and twice as bright for content objects that are transparent (e.g., multiple sources, such as a wire-mesh content might look twice as bright). A floating image with an apparent 3D structure may also be provided via two-dimensional encoding.

In order to achieve a display device operable to produce floating images with high resolution, a high resolution display configured to provide light to a lens system may be used. This in turn may stipulate a small pixel size of the high resolution display to enable a high degree of granularity for achieving high resolution output. Alternatively, two or more displays may be tiled to achieve high resolution output. In either case, additional cost and complexity may be imposed on an optical system integrating such display(s) by the high resolution stipulation. However, by configuring certain optical properties of a display relative to a lens array, high resolution output (e.g., high resolve, sharpness) may be achieved by associating output from sets of multiple display pixels with corresponding lenslets of a lens array, without requiring the display itself to have a relatively high resolution.

Figure 15:
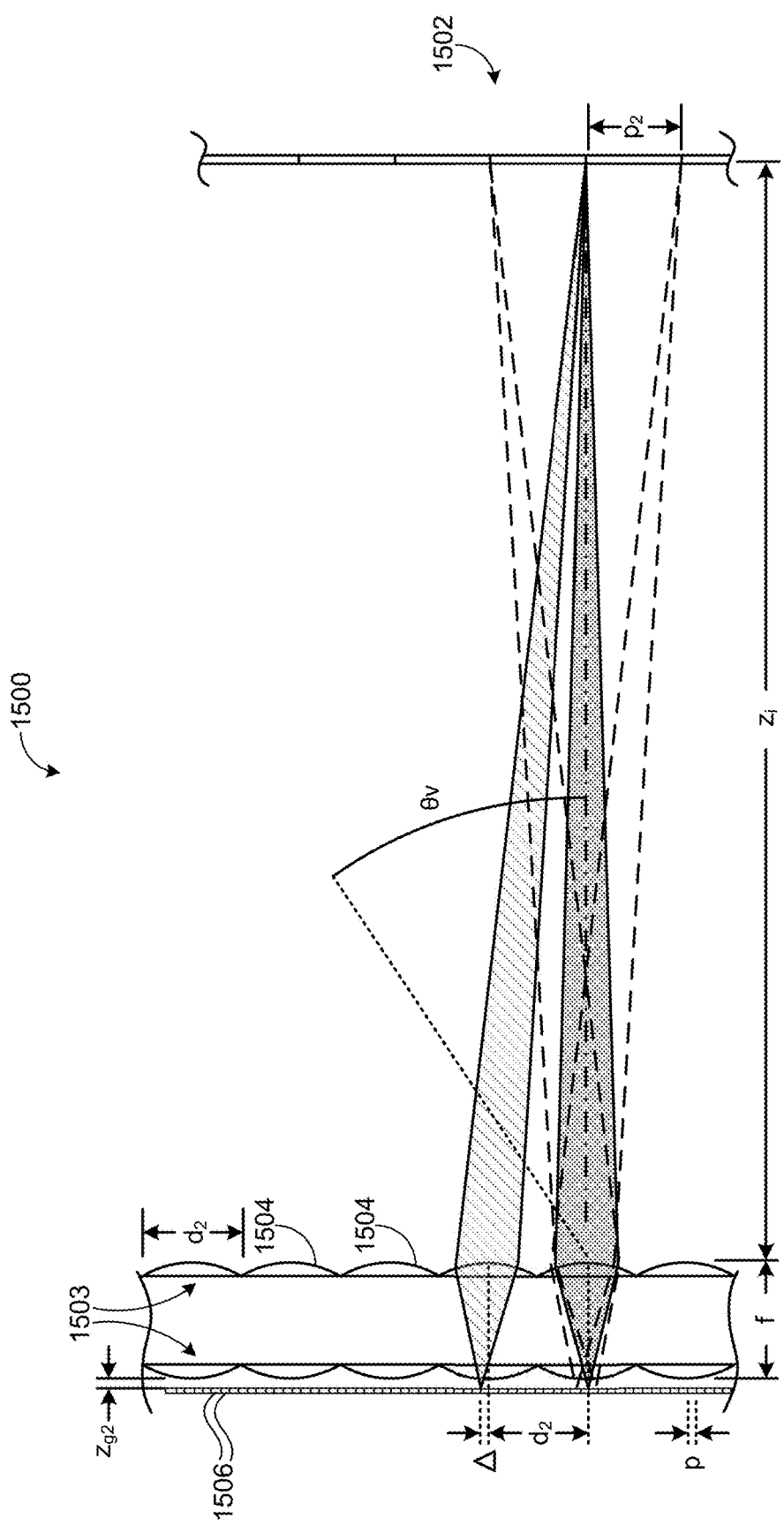
FIG. 15 shows an example display device configured to produce a high resolution floating image.

FIG. 15 shows an example display device 1500 configured to produce a high resolution floating image 1502 by associating output from sets of multiple display pixels (e.g., encoded regions) with corresponding lenslets of an in-tandem pair of lens arrays 1503. In particular, a sum of a distance $d_2$ between adjacent lenslets 1504 and an offset $\Delta$ is equal to an integer multiple i of a distance p between adjacent pixels 1506. In this example, the maximum view angle $\theta_v$ is determined by the acceptance NA of lens arrays 1503:

$$\theta_v = \pm \left(\frac{180}{\pi}\right) \tan^{-1}\left[\frac{d}{2 f_{air}}\right],$$

and the focal length in air may be defined in terms of the radius of curvature R and refractive index n:

$$f_{air} = \left(\frac{R}{n-1}\right).$$

The pixel size $p_2$ (e.g., perceived pixel size) of floating image 1502 can be defined in terms of the object pixel pitch p, focal length $f_{air}$, and image distance $z_i$ (or $s_i$):

$$p_2 = \frac{s_i p}{f_{air}}.$$

Continuing with this example, the offset $\Delta$ due to the floating image at $s_i$ is $$\Delta = \frac{f_{air} d}{s_i},$$

and by stipulating the integer multiple relation described above: $d+\Delta=ip$, the following relation is implied:

$$d = \frac{ip}{(1 + f_{air}/s_i)}, \text{ and } N_2 = \frac{f_{air} N}{s_i}.$$

Addressability can then be estimated based on input object resolution along a dimension, focal length, and target image distance $s_i$. It should be noted by relation between lenslet pitch d and pixel spacing p, that lenslet pitch d may not be an integer multiple of pixel spacing p. For scenarios of forming a two-dimensional floating image, this relation may provide high resolve of the image detail of sub-pixel content, even though addressability would be limited to image addressable resolution $N_2$.

One or more of the above-described lens systems and/or display systems (or portions thereof) may be implemented in connection with digital integral imaging, e.g., digital integral displays. The digital integral imaging may be used to provide signs, live displays, near-eye displays, light field displays, and other imaging. Light field photographs, integral displays, and related encoding may be provided via the above-described lens systems.

Figure 16:
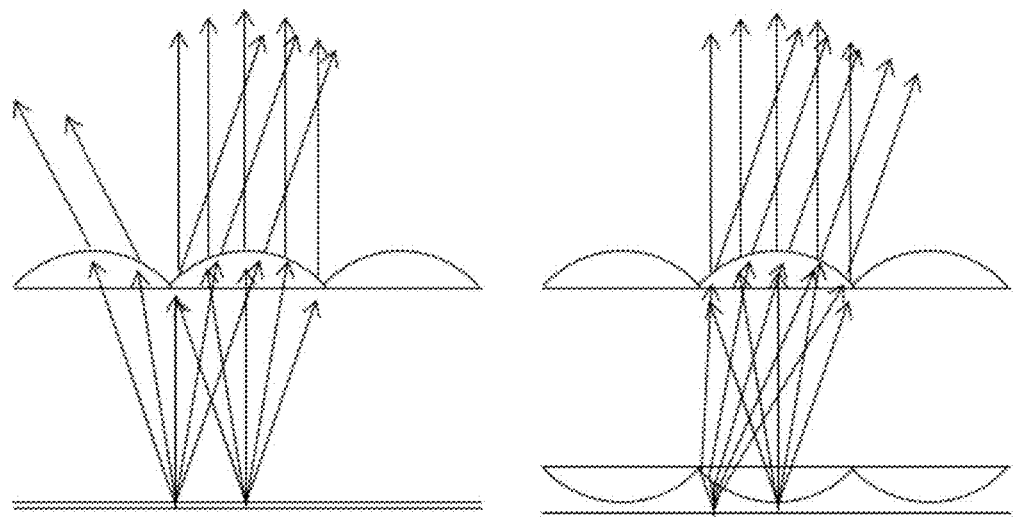
FIG. 16 depicts an example of telecentric correction via an inner lens array.

FIG. 16 depicts an example of telecentric correction via an inner lens array. For a given output cone NA emitted at a surface normal from a display, the amount of light accepted by a single MLA may vary with pixel position, because there may be a roll-off associated with the display view angle. When an FT-pair is used, however, normal exiting light may be redirected to efficiently pass through the outer lenslet, independent of pixel position. As a result, the effect of intensity roll-off vs view angle may be avoided. This also helps maintain image formation, as loss of spatial frequency content may be reduced.

Figure 17:
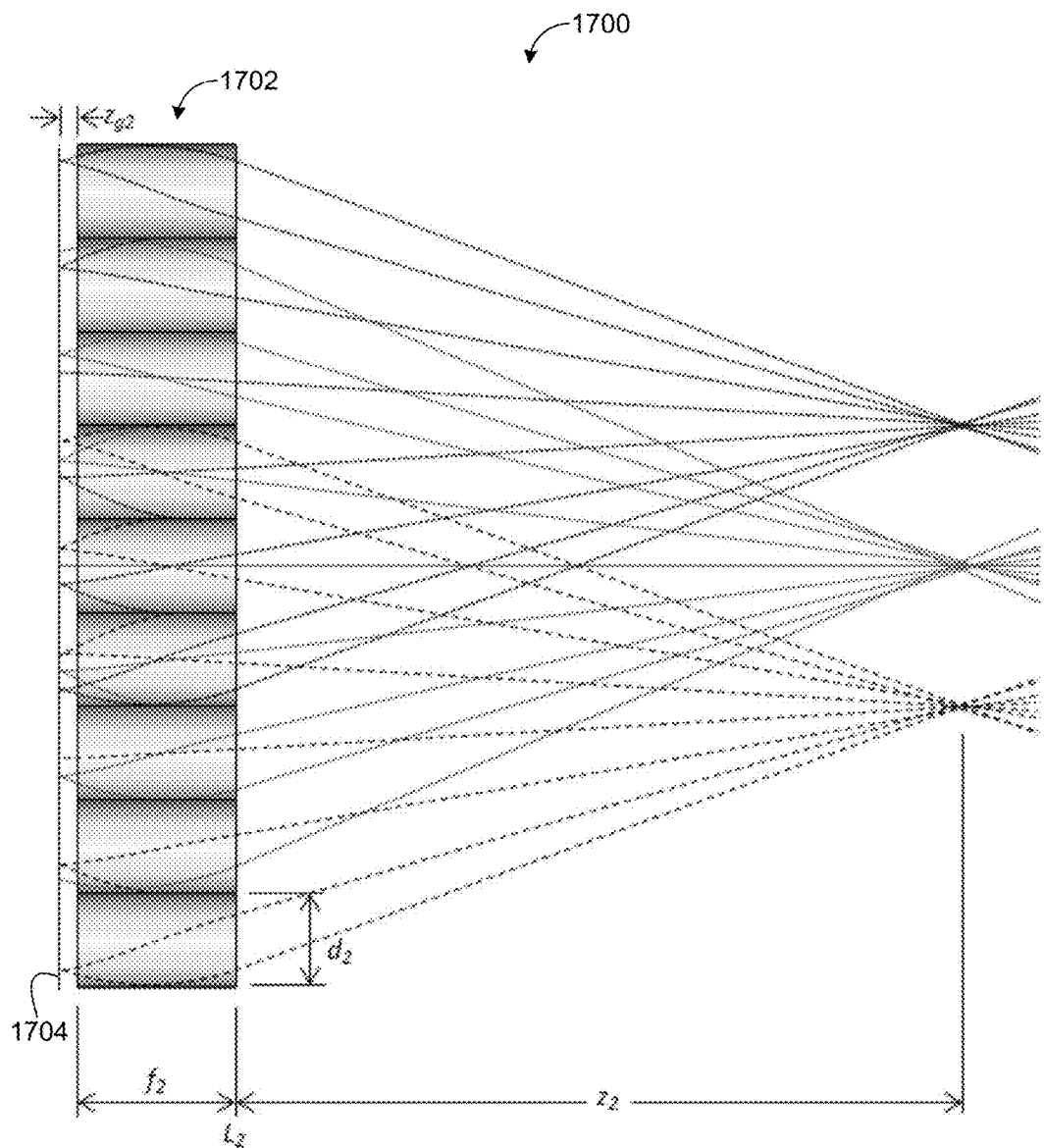
FIG. 17 shows an example display device including a GRIN lens array structure positioned to receive encoded image light.

FIG. 17 shows an example display device 1700 including a GRIN microlens array structure 1702 positioned to receive encoded image light from a display 1704, which serves as an FT array. Display 1704 includes a plurality of encoded regions, and is spaced away from GRIN structure 1702 by a distance $z_{g2}$, which represents the optical gap that enables optimal reconvergence at an image conjugate distance $z_2$. Distance $z_2$ may support a range of z-distances throughout which desired reconvergence and production of floating imagery is supported, and, as such, may be a range throughout which two and three-dimensional floating images can be produced. Each cell within GRIN structure 1702 may have a parabolic refractive index profile to enable each cell to function as an FT equivalent length, and thereby obtain desired image conjugate formation for each cell and convergence of imaging from multiple cells, along with appropriate encoded content from the encoded regions of display 1704. As an example, each cell may have an optical length, as defined in terms of a GRIN lens pitch, of 0.25 p, thus $\frac{1}{4}^{th}$ of the GRIN lens length associated with a full sinusoidal period of cyclic convergence and divergence. As described above, EMA may be used to block light encountering the edge of a cell in GRIN structure 1702.

Figure 18:
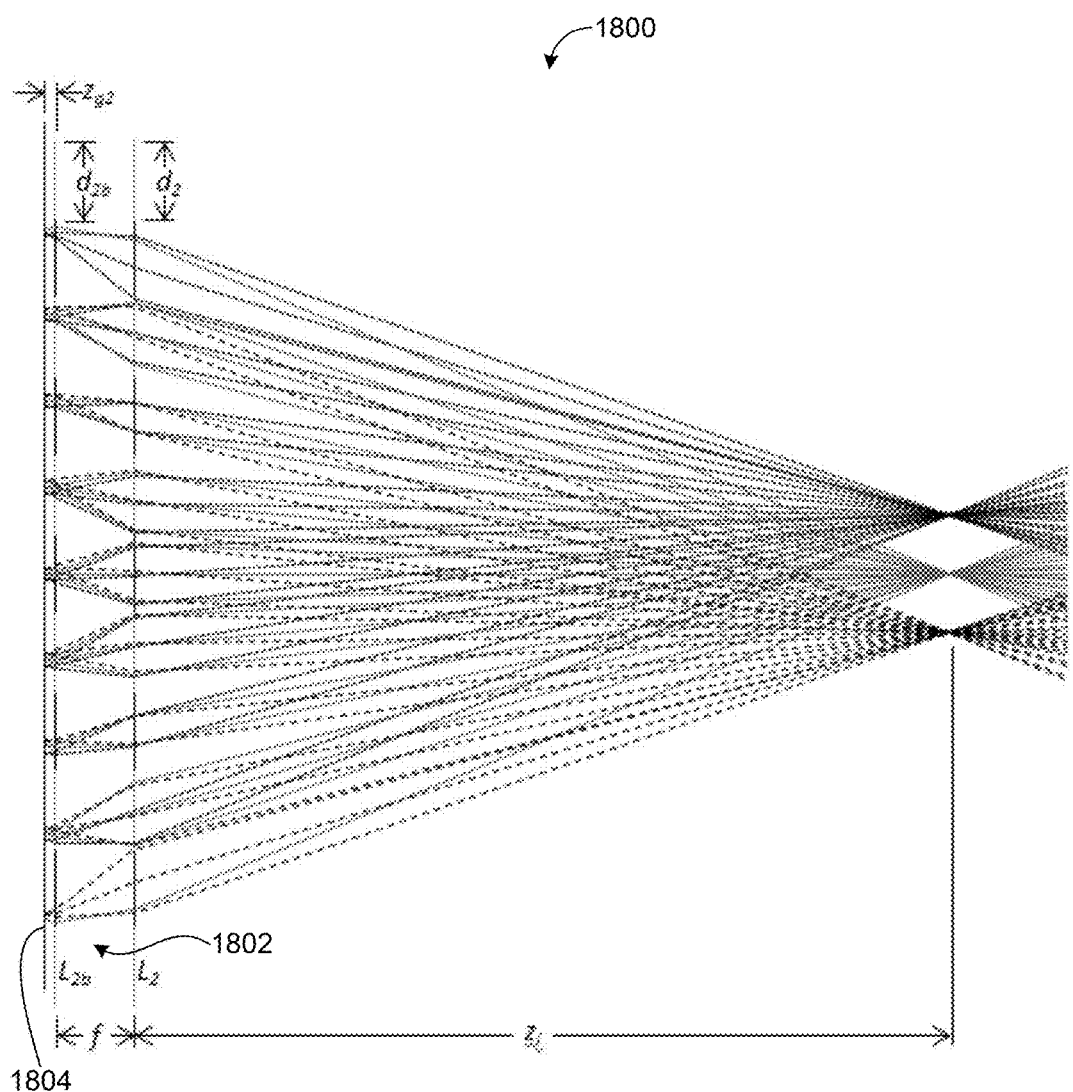
FIG. 18 shows an example display device including an FT array using an in-tandem pair of microlens arrays positioned to receive encoded image light.

FIG. 18 shows an example display device 1800 including an FT array 1802 formed by an in-tandem pair of microlens arrays positioned to receive encoded image light from a display 1804. Display 1804 includes a plurality of encoded regions, and is spaced away from FT array 1802 by a distance $z_{g2}$, which represents the optical gap that enables optimal reconvergence at an image conjugate distance $z_i$, as described above. FT array 1802 includes an in-tandem pair of microlens structures, which implement a Fourier transform to decode encoded image light received from display 1804 and produce two or three-dimensional floating images. In the example depicted in FIG. 18, a first microlens structure exhibits an array pitch $d_{2b}$, and is positioned optically upstream of a second microlens structure which exhibits an array pitch $d_2$. The array pitches $d_2$ and $d_{2b}$ may be substantially equal or unequal, as required to meet equation relations of array-based imaging to form an image.

Figure 19:
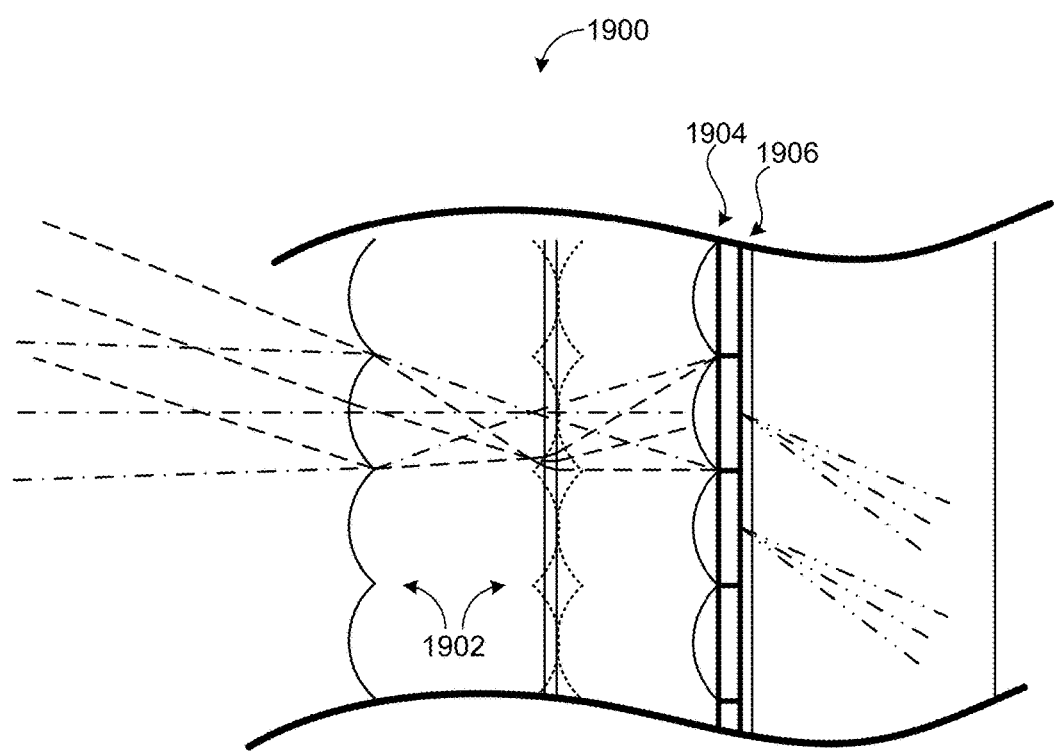
FIG. 19 shows an example display device in which light is optically encoded.

In some implementations, an image source may include encoded regions which are optically encoded, as opposed to digitally encoded by use of a 2D display. For example, a holographic imaging lightguide, which accepts pupil space image content at edge, which may include projected content from a scanned-beam display or projection display, thus may have image content coupled in angle space into the guide, and further include a holographic extraction layer on one side of the guide which extracts light at angles which varies across position along the guide, the Bragg response being significantly wide for all positions such that a lens array or FT array, disposed just after the holographic extraction layer, includes lenslets, each of which may image the angular light content into position space to fill the width of the lenslet, and may thus provide an optically encoded image source which may be used as input to the FT array, in order to decode the encoded image light into a floating image. The angular acceptance of the holographic imaging guide extraction layer substantially matches the angular acceptance of a lens array or FT array which is used to form the optical encoding image source. As an example illustrating the utilization of optically encoded regions, FIG. 19 shows an example display device 1900 including array-based imaging layers 1902, an optical encoding layer 1904, and an extraction layer 1906. Optical encoding layer 1904 may include a lens or FT array, for example.

In some embodiments, the methods and processes described herein may be tied to a computing system of one or more computing devices. In particular, such methods and processes may be implemented as a computer-application program or service, an application-programming interface (API), a library, and/or other computer-program product.

Figure 20:
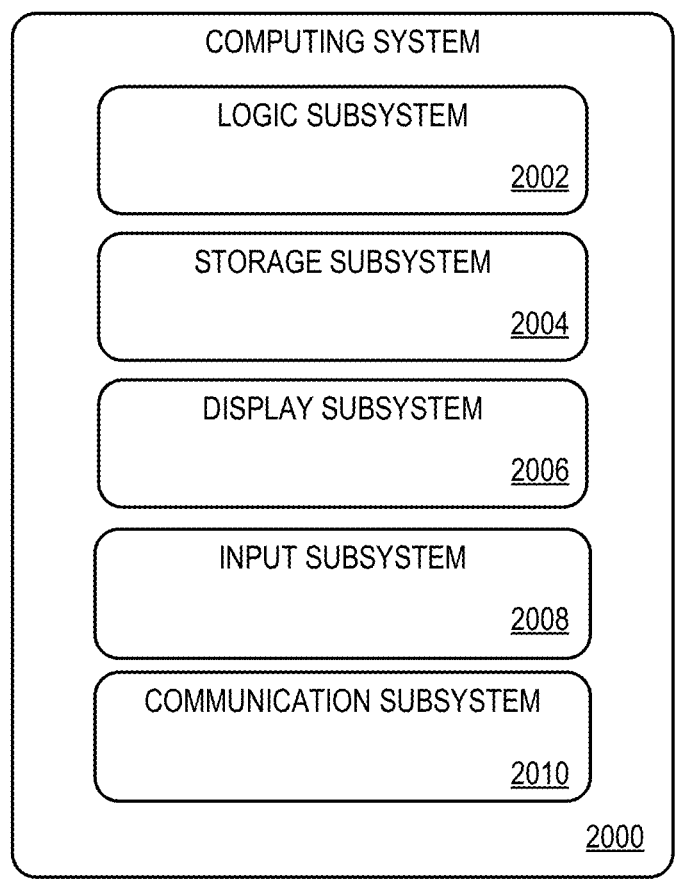
FIG. 20 shows a block diagram of an example computing device.

FIG. 20 schematically shows a non-limiting embodiment of a computing system 1900 that can enact one or more of the methods and processes described above. Computing system 1900 is shown in simplified form. Computing system 1900 may take the form of one or more personal computers, server computers, tablet computers, home-entertainment computers, network computing devices, gaming devices, mobile computing devices, mobile communication devices (e.g., smart phone), and/or other computing devices.

Computing system 1900 includes a logic machine 2002 and a storage machine 2004. Computing system 1900 may optionally include a display subsystem 2006, input subsystem 2008, communication subsystem 2010, and/or other components not shown in FIG. 20.

Logic machine 2002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 2004 includes one or more physical devices configured to hold instructions executable by the logic machine to implement the methods and processes described herein. When such methods and processes are implemented, the state of storage machine 2004 may be transformed—e.g., to hold different data.

Storage machine 2004 may include removable and/or built-in devices. Storage machine 2004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 2004 may include volatile, nonvolatile, dynamic, static, read/write, read-only, random-access, sequential-access, location-addressable, file-addressable, and/or content-addressable devices.

It will be appreciated that storage machine 2004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 2002 and storage machine 2004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1900 implemented to perform a particular function. In some cases, a module, program, or engine may be instantiated via logic machine 2002 executing instructions held by storage machine 2004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 2006 may be used to present a visual representation of data held by storage machine 2004. This visual representation may take the form of a graphical user interface (GUI). As the herein described methods and processes change the data held by the storage machine, and thus transform the state of the storage machine, the state of display subsystem 2006 may likewise be transformed to visually represent changes in the underlying data. Display subsystem 2006 may include one or more display devices utilizing virtually any type of technology. Such display devices may be combined with logic machine 2002 and/or storage machine 2004 in a shared enclosure, or such display devices may be peripheral display devices.

When included, input subsystem 2008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, in some embodiments, a depth sensor, such as time of flight (TOF) or stereo depth, providing a depth map of a scene, may be used to track a user, gestures, and/or head movements, and provide changes to encoded content in order to provide a floating display which is interactive with the user.

When included, communication subsystem 2010 may be configured to communicatively couple computing system 1900 with one or more other computing devices. Communication subsystem 2010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1900 to send and/or receive messages to and/or from other devices via a network such as the Internet.

Another example provides a display device comprising an image source including a plurality of encoded regions from which encoded image light is output, and a Fourier transform array positioned to receive the encoded image light and output decoded image light that forms a floating image viewable from a plurality of different vantage points, wherein from a first vantage point decoded image light forming a portion of the floating image originates from a first encoded region, and wherein from a second vantage point decoded image light forming the portion originates from a second encoded region, different than the first encoded region. In such an example, the image source alternatively or additionally may include a display image. In such an example, the image source alternatively or additionally may include a static image. In such an example, the image source alternatively or additionally may include a stitched display image formed by optically combining output from two or more displays. In such an example, the output from the two or more displays alternatively or additionally may be optically combined via a lens array. In such an example, the output from the two or more displays alternatively or additionally may be optically combined via array-based imaging. In such an example, the Fourier transform array alternatively or additionally may include a lens array pair. In such an example, the Fourier transform array alternatively or additionally may include a graded-index microlens array structure. In such an example, the floating image alternatively or additionally may be a three-dimensional image. In such an example, the floating image alternatively or additionally may be a two-dimensional image. In such an example, the floating image alternatively or additionally may have an apparent z-distance that is positive relative to the image source. In such an example, the floating image alternatively or additionally may have an apparent z-distance that is negative relative to the image source. In such an example, the floating image alternatively or additionally may have an apparent z-distance that is coplanar with the image source. In such an example, the portion of the floating image alternatively or additionally may be related to the first encoded region by a geometric transformation. In such an example, the display device alternatively or additionally may comprise an actuator operatively coupled to the Fourier transform array and configured to adjust a position of the Fourier transform array relative to the image source to thereby adjust an apparent z-distance of the floating image. In such an example, the image source alternatively or additionally may be configured to vary the encoded image light to thereby adjust an apparent z-distance of the floating image. In such an example, the floating image alternatively or additionally may have an apparent z-distance that is determined at least in part by a pitch of the plurality of encoded regions relative to a pitch of the Fourier transform array.

Another example provides a display device comprising an image source including two or more displays that cooperatively form a stitched display image including a plurality of encoded regions of encoded image light, and a Fourier transform array positioned to receive the encoded image light and output decoded image light that forms a floating image viewable from a plurality of different vantage points, wherein from a first vantage point decoded image light forming a portion of the floating image originates from a first encoded region, and wherein from a second vantage point decoded image light forming the portion originates from a second encoded region, different than the first encoded region. In such an example, the floating image alternatively or additionally may be a two-dimensional image, and the two-dimensional image alternatively or additionally may have an apparent z-distance that is positive relative to the image source.

Another example provides a display device comprising an image source including a plurality of encoded regions from which encoded image light is output, and a lens array including a plurality of lenslets, the lens array positioned to receive the encoded image light and output decoded image light that forms a floating image viewable from a plurality of different vantage points, wherein from a first vantage point decoded image light forming a portion of the floating image originates from a first encoded region, wherein from a second vantage point decoded image light forming the portion originates from a second encoded region, different than the first encoded region, and wherein a sum of a distance between adjacent lenslets and an offset is equal to an integer multiple of a distance between adjacent encoded regions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
an image source including a plurality of encoded regions from which encoded image light is output; and
a Fourier transform array positioned to receive the encoded image light and output decoded image light that forms a floating image viewable from a plurality of different vantage points, wherein from a first vantage point decoded image light forming a portion of the floating image originates from a first encoded region, and wherein from a second vantage point decoded image light forming the portion originates from a second encoded region, different than the first encoded region.

2. The display device of claim 1, wherein the image source includes a display image.

3. The display device of claim 1, wherein the image source includes a static image.

4. The display device of claim 1, wherein the image source includes a stitched display image formed by optically combining output from two or more displays.

5. The display device of claim 4, wherein the output from the two or more displays is optically combined via a lens array.

6. The display device of claim 4, wherein the output from the two or more displays is optically combined via array-based imaging.

7. The display device of claim 1, wherein the Fourier transform array includes a lens array pair.

8. The display device of claim 1, wherein the Fourier transform array includes a graded-index microlens array structure.

9. The display device of claim 1, wherein the floating image is a three-dimensional image.

10. The display device of claim 1, wherein the floating image is a two-dimensional image.

11. The display device of claim 1, wherein the floating image has an apparent z-distance that is positive relative to the image source.

12. The display device of claim 1, wherein the floating image has an apparent z-distance that is negative relative to the image source.

13. The display device of claim 1, wherein the floating image has an apparent z-distance that is coplanar with the image source.

14. The display device of claim 1, wherein the portion of the floating image is related to the first encoded region by a geometric transformation.

15. The display device of claim 1, further comprising an actuator operatively coupled to the Fourier transform array and configured to adjust a position of the Fourier transform array relative to the image source to thereby adjust an apparent z-distance of the floating image.

16. The display device of claim 1, wherein the image source is configured to vary the encoded image light to thereby adjust an apparent z-distance of the floating image.

17. The display device of claim 1, wherein the floating image has an apparent z-distance that is determined at least in part by a pitch of the plurality of encoded regions relative to a pitch of the Fourier transform array.

18. A display device, comprising:
an image source including two or more displays that cooperatively form a stitched display image including a plurality of encoded regions of encoded image light; and
a Fourier transform array positioned to receive the encoded image light and output decoded image light that forms a floating image viewable from a plurality of different vantage points, wherein from a first vantage point decoded image light forming a portion of the floating image originates from a first encoded region, and wherein from a second vantage point decoded image light forming the portion originates from a second encoded region, different than the first encoded region.

19. The display device of claim 18, wherein the floating image is a two-dimensional image, and wherein the two-dimensional image has an apparent z-distance that is positive relative to the image source.

20. A display device, comprising:
an image source including a first region from which first image light is output, and a second region from which second image light is output; and
a Fourier transform lens array positioned to receive the first image light and the second image light, the Fourier transform lens array configured to output a floating image viewable from a plurality of different vantage points, wherein from a first vantage point a portion of the floating image is formed by the first image light output from the first region, and wherein from a second vantage point different than the first vantage point the portion of the floating image is formed by the second image light output from the second region.

* * * * *